US 12,298,708 B2

United States Patent
Ishidate et al.

(10) Patent No.: US 12,298,708 B2
(45) Date of Patent: May 13, 2025

(54) IMAGE FORMING APPARATUS WITH COOLING CONFIGURATION

(71) Applicant: CANON KABUSHIKI KAISHA, Tokyo (JP)

(72) Inventors: Takehiro Ishidate, Tokyo (JP); Hiroki Takano, Saitama (JP); Ryoichi Kawasumi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/486,695

(22) Filed: Oct. 13, 2023

(65) Prior Publication Data

US 2024/0126205 A1 Apr. 18, 2024

(30) Foreign Application Priority Data

Oct. 18, 2022 (JP) .................................. 2022-167078

(51) Int. Cl.
*G03G 15/04* (2006.01)
*B41J 2/45* (2006.01)
*B41J 29/377* (2006.01)
*G03G 21/20* (2006.01)
*G06K 15/00* (2006.01)
*G06K 15/12* (2006.01)

(52) U.S. Cl.
CPC .............. *G03G 21/206* (2013.01); *B41J 2/45* (2013.01); *B41J 29/377* (2013.01);
(Continued)

(58) Field of Classification Search
CPC ....... G03G 15/04054; G03G 15/04063; G03G 21/206; G03G 2215/0407;
(Continued)

(56) References Cited

U.S. PATENT DOCUMENTS

2013/0016992 A1* 1/2013 Watanabe ............ G03G 15/011
399/92
2013/0142538 A1* 6/2013 Miwa ................. G03G 21/1803
399/92
(Continued)

FOREIGN PATENT DOCUMENTS

EP 1538001 A1 * 6/2005 .............. B41J 2/473
JP 2007140349 A * 6/2007
(Continued)

*Primary Examiner* — Robert B Beatty
(74) *Attorney, Agent, or Firm* — Canon U.S.A., Inc. I.P. Division

(57) ABSTRACT

An image forming apparatus having front and rear surfaces, a photoreceptor having a rotation axis extending in a first direction, an exposure unit, and a cooling unit. The exposure unit includes a substrate having a longitudinal axis extending in the first direction, a first surface and a second surface. A plurality of light emitting elements that emit light toward the photoreceptor are mounted on the first surface of the substrate. The cooling unit includes an intake port that sucks air from outside of the image forming apparatus. The intake port is disposed at an intake port distance in the first direction to the rear surface. The intake port distance is shorter than a distance in the first direction of a center of the substrate to the rear surface. The cooling unit cools the substrate by blowing air sucked by the intake port onto the second surface of the substrate.

13 Claims, 22 Drawing Sheets

(52) U.S. Cl.
CPC ... *G03G 15/04054* (2013.01); *G06K 15/1247* (2013.01); *G03G 2215/0409* (2013.01); *G03G 2221/1645* (2013.01)

(58) Field of Classification Search
CPC ... G03G 2215/0409; G03G 2215/0412; G03G 2221/1645; B41J 2/45; B41J 29/377; G06K 15/1247; G06K 15/1261; H04N 1/02865; H04N 1/191; H04N 1/195
See application file for complete search history.

(56) References Cited

U.S. PATENT DOCUMENTS

| | | | |
|---|---|---|---|
| 2016/0070230 A1* | 3/2016 | Kokubu | G03G 21/206 399/92 |
| 2016/0085208 A1* | 3/2016 | Imai | G03G 21/20 347/118 |
| 2018/0275550 A1* | 9/2018 | Yuasa | G03G 15/0189 |
| 2021/0302864 A1* | 9/2021 | Kasuya | B41J 2/525 |
| 2023/0288837 A1* | 9/2023 | Kawasumi | G03G 21/206 |
| 2023/0288869 A1* | 9/2023 | Kawasumi | G03G 21/206 |
| 2023/0324827 A1* | 10/2023 | Ishidate | G03G 15/043 399/92 |
| 2023/0324848 A1* | 10/2023 | Kawasumi | G03G 21/206 |

FOREIGN PATENT DOCUMENTS

| | | | |
|---|---|---|---|
| JP | 2008286969 A | * | 11/2008 |
| JP | 2009255382 A | * | 11/2009 |
| JP | 2016057340 A | | 4/2016 |
| JP | 6582376 B2 | | 10/2019 |

\* cited by examiner

X-X

IMAGE FORMING APPARATUS WITH COOLING CONFIGURATION

BACKGROUND

Field

The present disclosure relates to an image forming apparatus including an exposure head that exposes a photoreceptor.

Description of the Related Art

Conventionally, as a technique related to an exposure head used in an image forming apparatus of an electrophotographic system, a technique described in Japanese Patent No. 6582376 is known.

In Japanese Patent No. 6582376, an exposure head of an LED array system in which a plurality of light emitting elements are arranged along an axial direction of a photoreceptor is used as an exposure head that forms a latent image on the photoreceptor.

The exposure head described in Japanese Patent No. 6582376 is disposed close to the photoreceptor together with a developing apparatus that develops the latent image formed on the photoreceptor with toner. Therefore, the exposure head is disposed close to the developing apparatus.

The exposure head includes a light emitting diode (LED) as a light emitting element. Alternatively, some light emitting elements include organic electro luminescence (EL). The organic EL may be referred to as an organic light emitting diode (OLED).

It is known that the exposure head dissipates heat according to a length of a light emission time and a magnitude of a light emission amount of such a light emitting element. Since the exposure head is disposed close to the developing apparatus that causes toner to adhere to the photoreceptor, a cooling unit is often required in order to suppress an influence of the heat from the exposure head on the toner. Japanese Patent No. 6582376 adopts a configuration in which an airflow flows in a lower portion of the exposure head as the cooling unit of the exposure head, and discloses a configuration in which an introduction port for introducing the airflow also serves as an insertion port of a harness for energizing the exposure head.

In general, in an image forming apparatus, a substrate including a power supply and an IC, a high-voltage substrate, and the like are densely disposed on a rear surface of a main body. Therefore, a temperature of an image forming unit including a photoreceptor and an exposure head is higher on a rear surface side (back side) than on a front surface side (front side) of the image forming apparatus. Therefore, the temperature of the exposure head rises together with light emission at the time of image formation, but the temperature is higher on an apparatus rear surface side of the substrate on which a plurality of light emitting elements are mounted in a longitudinal direction (front-back direction) than on an apparatus front surface side for the above-described reason. That is, the exposure head has a temperature gradient in the longitudinal direction of the substrate.

Japanese Patent No. 6582376 discloses a configuration in which air is taken in by an intake fan disposed in a lower portion of an image forming apparatus on a rear surface side and is exhausted by an exhaust fan disposed in an upper portion of the image forming apparatus on the rear surface side. That is, in Japanese Patent No. 6582376, since the intake fan is disposed on the rear surface side of the image forming apparatus and a power source and the like are densely disposed, as a result, the exposure head may have a higher temperature gradient in the longitudinal direction of the substrate.

SUMMARY

According to an aspect of the present disclosure, an image forming apparatus includes a photoreceptor having a rotation axis extending in a first direction connecting a front surface and a rear surface of the image forming apparatus, an exposure unit configured to expose the photoreceptor to form a latent image on the photoreceptor, and a cooling unit configured to cool the exposure unit, wherein the exposure unit includes a substrate where the substrate has a longitudinal axis extending in the first direction, has a first surface on which a plurality of light emitting elements configured to emit light toward the photoreceptor are mounted, and has a second surface opposite to the first surface, wherein the cooling unit includes an intake port that is configured to suck air from outside of the image forming apparatus and that is disposed at an intake port distance in the first direction to the rear surface, the intake port distance being shorter than a first distance in the first direction of a center of the substrate to the rear surface, and wherein the cooling unit is configured to cool the substrate by blowing air sucked by the intake port onto the second surface of the substrate.

Further features of the present disclosure will become apparent from the following description of exemplary embodiments with reference to the attached drawings.

DESCRIPTION OF THE EMBODIMENTS

Hereinafter, an embodiment of the present disclosure will be described with reference to the drawings. The dimensions, materials, shapes, relative arrangements, and the like of components described below are not intended to limit the scope of the present disclosure only to them unless otherwise specified.

(Image Forming Apparatus)

Figure 1:
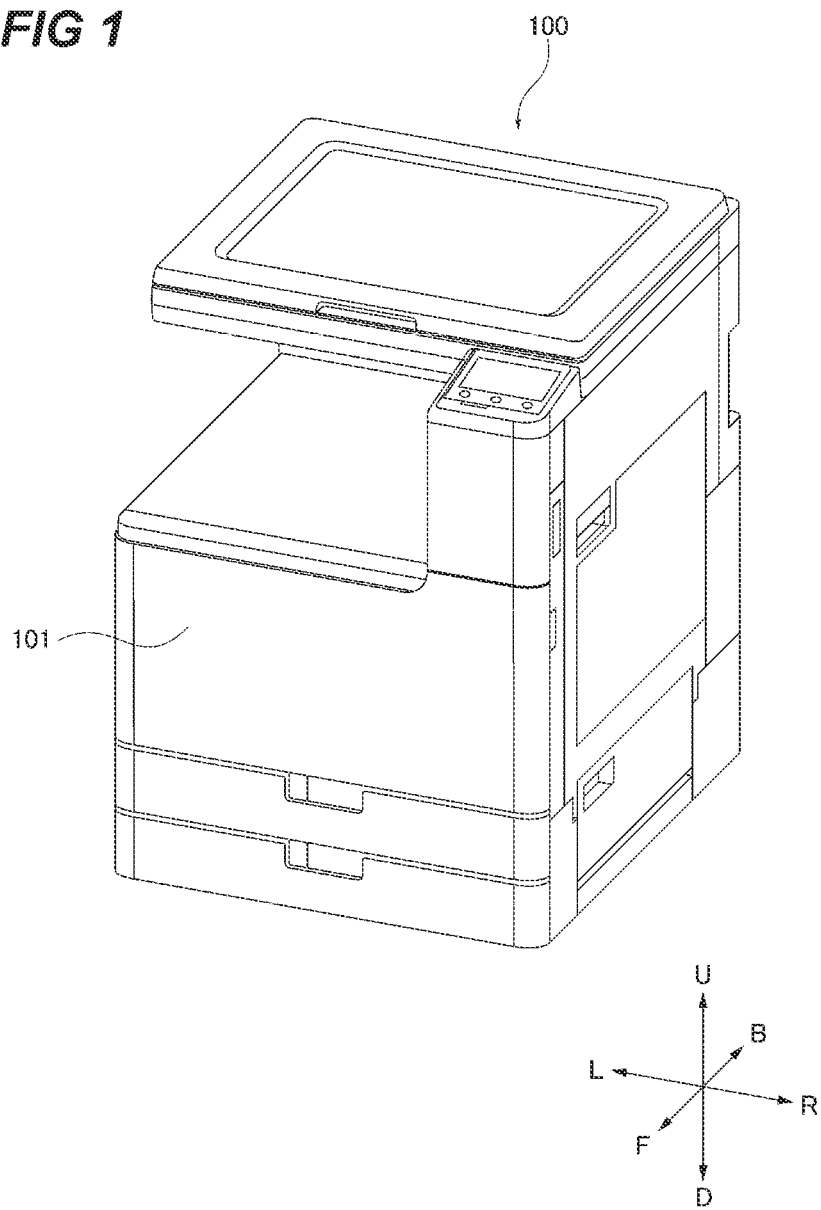
FIG. 1 is a perspective view of an image forming apparatus.
Figure 2:
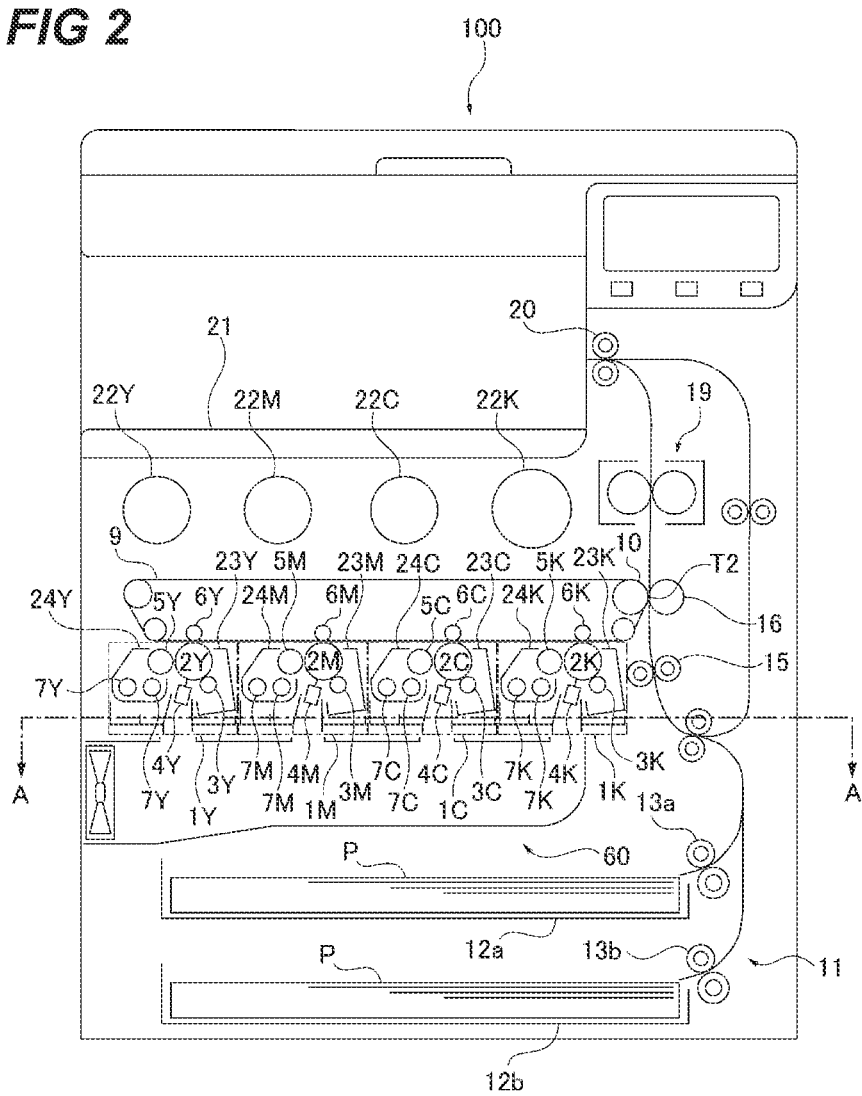
FIG. 2 is a schematic cross-sectional view of the image forming apparatus in FIG. 1.
Figure 3:
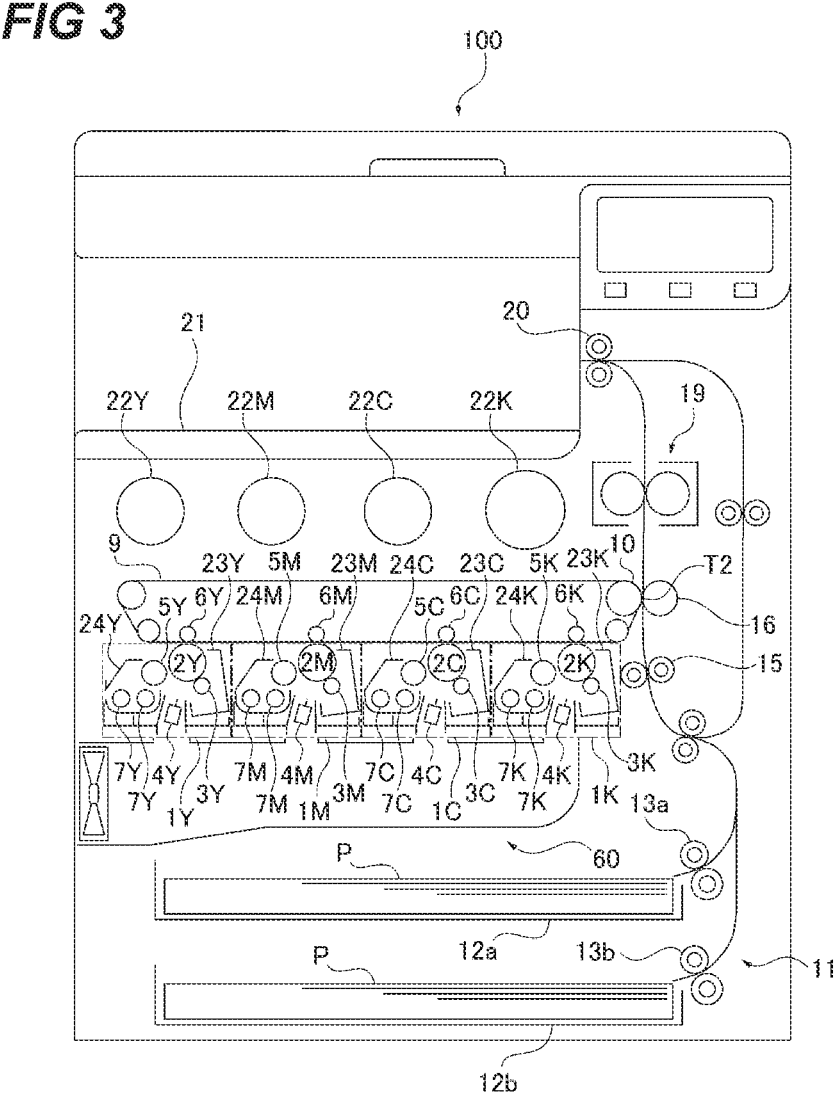
FIG. 3 is a schematic cross-sectional view of the image forming apparatus in FIG. 1.

First, a schematic configuration of an image forming apparatus 100 will be described with reference to FIGS. 1, 2, and 3. FIG. 1 is a perspective view of the image forming apparatus 100. FIGS. 2 and 3 are schematic cross-sectional views of the image forming apparatus in FIG. 1. The image forming apparatus 100 illustrated in FIGS. 1 to 3 is a copying machine including a reading apparatus, but the embodiment may be another image forming apparatus such as a printer not including a reading apparatus. The embodiment is not limited to a color image forming apparatus including a plurality of photosensitive drums 2 as illustrated in FIGS. 2 and 3, and may be a color image forming apparatus including one photosensitive drum 2 or an image forming apparatus that forms a monochrome image.

The image forming apparatus 100 illustrated in FIGS. 2 and 3 includes four image forming units 1Y, 1M, 1C, and 1K (hereinafter, also collectively and simply referred to as an "image forming unit 1") that form toner images of respective colors of yellow, magenta, cyan, and black.

The image forming units 1Y, 1M, 1C, and 1K include photosensitive drums 2Y, 2M, 2C, and 2K (hereinafter, also collectively and simply referred to as a "photosensitive drum 2"), which are examples of photoreceptors, respectively. The photosensitive drum 2 may be a photosensitive belt.

The image forming units 1Y, 1M, 1C, and 1K include charging rollers 3Y, 3M, 3C, and 3K (hereinafter, also collectively and simply referred to as a "charging roller 3") as charging units that respectively charge the photosensitive drums 2Y, 2M, 2C, and 2K.

In addition, the image forming units 1Y, 1M, 1C, and 1K include LED (light emitting diodes, hereinafter, referred to as an LED) exposure heads 4Y, 4M, 4C, and 4K (hereinafter, also collectively and simply referred to as an "exposure head 4") as exposure units that expose the photosensitive drums 2Y, 2M, 2C, and 2K.

Further, the image forming units 1Y, 1M, 1C, and 1K include developing units 24Y, 24M, 24C, and 24K (hereinafter, also collectively and simply referred to as a "developing unit 24") as developing units that develop the electrostatic latent image on the photosensitive drum 2 with toner and develop the toner image of each color on the photosensitive drum 2. Note that Y, M, C, and K attached to the reference numerals indicate the colors of the toner.

The image forming apparatus 100 illustrated in FIGS. 2 and 3 is an image forming apparatus that adopts a so-called "lower surface exposure system" that exposes the photosensitive drum 2 from below. In the image forming apparatus 100 adopting the lower surface exposure system, the exposure head 4 is disposed below the photosensitive drum 2. Hereinafter, a description will be given on the premise of an image forming apparatus adopting the lower surface exposure system. Note that although not illustrated, as an embodiment, an image forming apparatus adopting an "upper surface exposure system" that exposes the photosensitive drum from above may be used.

The image forming apparatus 100 includes an intermediate transfer belt 9 to which a toner image formed on the photosensitive drum 2 is transferred, and a primary transfer roller 6 (Y, M, C, K) that sequentially transfers the toner image formed on the photosensitive drum 2 to the intermediate transfer belt 9. The intermediate transfer belt 9 is disposed above the image forming unit 1. In addition to an intermediate transfer system using the intermediate transfer belt 9, a direct transfer system of directly transferring from the photosensitive drum 2 to a sheet may be used.

In addition, the image forming apparatus 100 includes a secondary transfer roller 16 as a transfer unit that transfers the toner image on the intermediate transfer belt 9 onto a recording sheet P conveyed from a feeding unit 11, and a fixing device 19 as a fixing portion that fixes the secondarily transferred image onto the recording sheet P. The secondary transfer roller 16 is in contact with a belt driving roller 10 of the intermediate transfer belt 9 with a predetermined pressing force via the intermediate transfer belt 9 to form a secondary transfer unit T2 with the intermediate transfer belt 9.

Toner bottles 22Y, 22M, 22C, and 22K (hereinafter, also collectively and simply referred to as a "toner bottle 22") that accommodate replenishment toners of the respective colors are detachably replaceable units with respect to the image forming apparatus 100. The toner bottle 22 is disposed above the intermediate transfer belt 9. In the toner bottle 22, an appropriate amount of toner is appropriately supplied from the corresponding toner bottle to each developing unit included in the four image forming units by a toner supply mechanism (not illustrated).

In addition, the image forming apparatus 100 includes the feeding unit 11 that feeds the recording sheet P. The feeding unit 11 includes sheet cassettes 12a and 12b, feeding rollers 13a and 13b, and a registration roller 15. The sheet cassettes 12a and 12b are disposed below the image forming unit 1. The recording sheets P accommodated in the sheet cassettes 12a and 12b are fed one by one by the feeding rollers 13a and 13b, and conveyed to the secondary transfer unit T2 at a predetermined timing by the registration roller 15.

Further, the image forming apparatus 100 includes a duct unit 60 in an attachable/detachable manner. The duct unit 60 is disposed below the image forming unit 1 and above the feeding unit 11. The duct unit 60 is an exposure cooling unit for communicating with the exposure head 4 through a lifting/lowering duct 69 described later and cooling the exposure head 4 with an airflow.

(Image Forming Process)

Next, an image forming process of the image forming apparatus 100 will be briefly described. The charging roller 3Y charges a surface of the photosensitive drum 2Y. The exposure head 4Y exposes the surface of the photosensitive drum 2Y charged by the charging roller 3Y. As a result, an electrostatic latent image is formed on the photosensitive drum 2Y. Next, the developing unit 24Y develops the electrostatic latent image formed on the photosensitive drum 2Y with yellow toner. The yellow toner image developed on the surface of the photosensitive drum 2Y is transferred onto the intermediate transfer belt 9 by the primary transfer roller 6Y. Magenta, cyan, and black toner images are also formed by the similar image forming process, and are transferred so as to be superimposed on the intermediate transfer belt 9.

The toner image of each color transferred onto the intermediate transfer belt 9 is conveyed to the secondary transfer unit T2 by the intermediate transfer belt 9. The toner images conveyed to the secondary transfer unit T2 are collectively transferred to the recording sheet P conveyed from the feeding unit 11 by the secondary transfer roller 16. The recording sheet P to which the toner image has been transferred is conveyed to the fixing device 19. The fixing device 19 fixes the toner image on the recording sheet P by heat and pressure. The recording sheet P subjected to the fixing processing by the fixing device 19 is discharged to a discharge tray 21 disposed above the toner bottle 22 by a discharge roller 20.

(Drum Unit and Developing Unit)

A replaceable drum unit 23 and the developing unit 24 in the image forming apparatus 100 of the present embodiment will be described by way of example.

Figure 4:
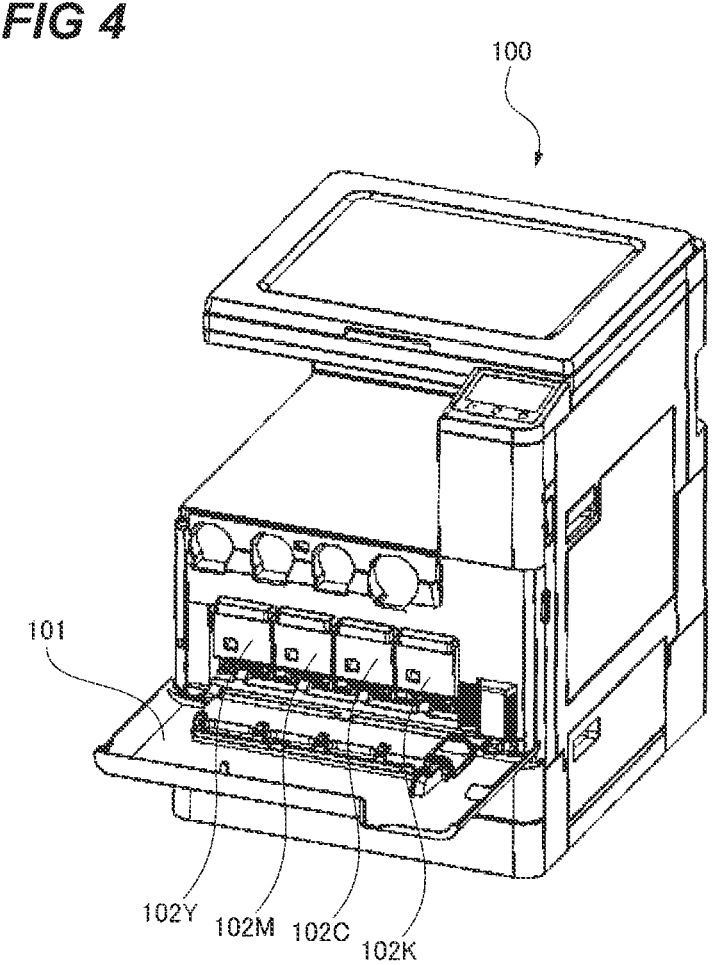
FIG. 4 is a perspective view of the image forming apparatus.
Figure 5:
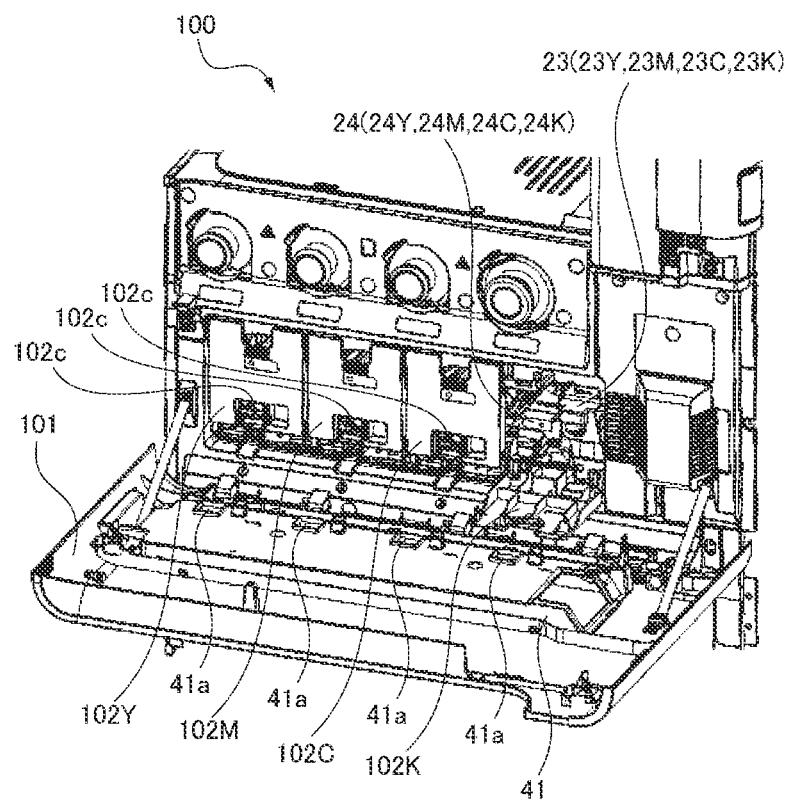
FIG. 5 is a partially enlarged perspective view of the image forming apparatus.
Figure 6:
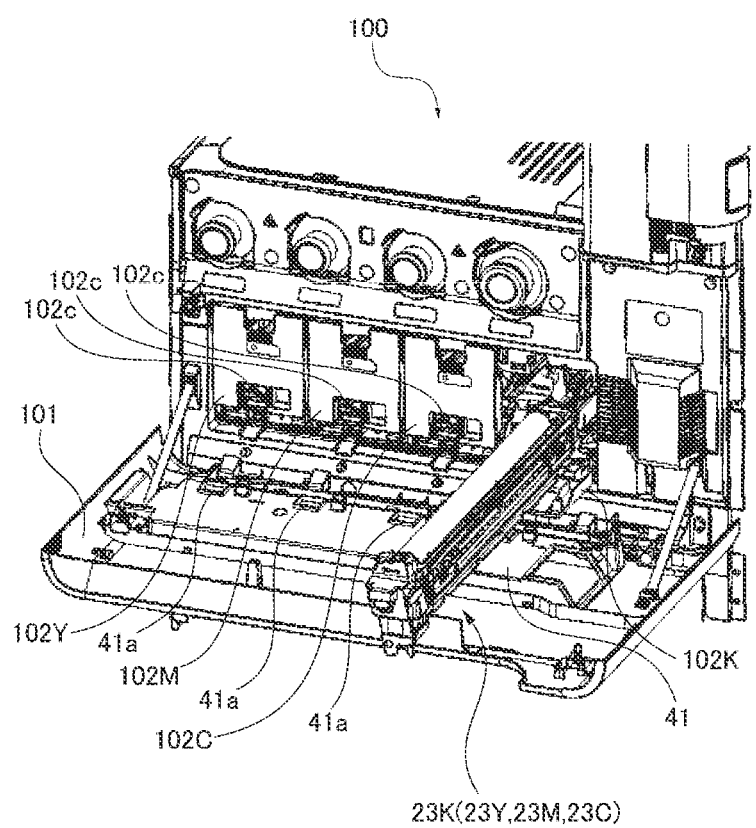
FIG. 6 is a partially enlarged perspective view of the image forming apparatus.
Figure 7:
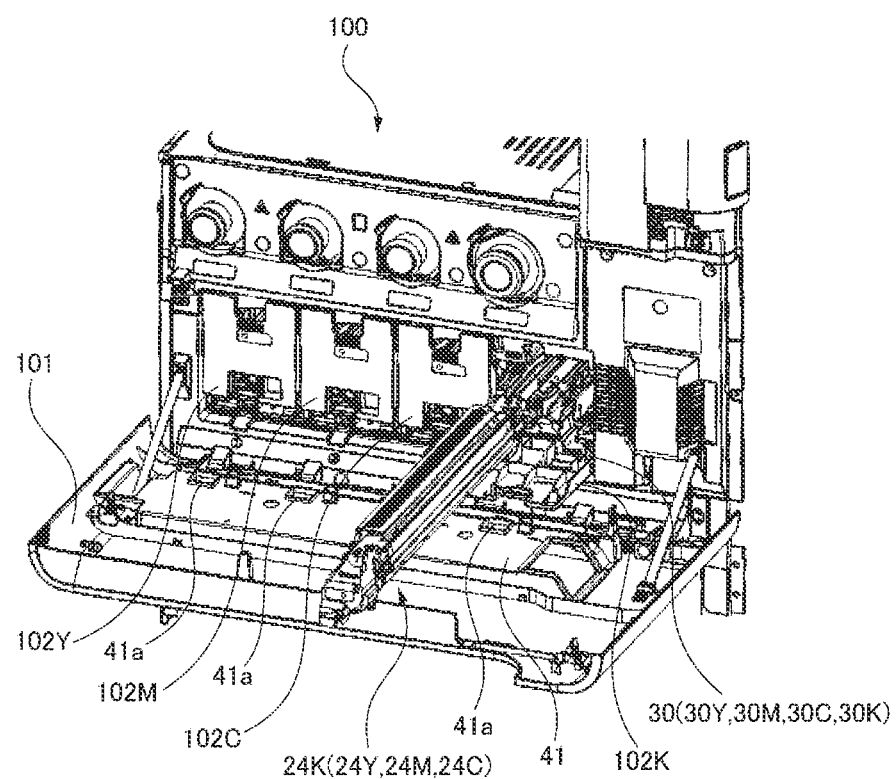
FIG. 7 is a partially enlarged perspective view of the image forming apparatus.

The photosensitive drum 2 and the charging roller 3 described above are integrally unitized (drum unit, drum cartridge) together with a cleaning apparatus not illustrated. An example of the configuration will be described with reference to FIGS. 4, 5, 6, and 7. FIGS. 4 and 5 are perspective views illustrating schematic structures around the drum unit 23 (Y, M, C, K) and around the developing unit 24 (Y, M, C, K) included in the image forming apparatus 100. FIG. 6 is a view illustrating a state in which the drum unit 23 is inserted into and removed from the image forming apparatus 100 from an outside of an apparatus main body. FIG. 7 is a view illustrating a state in which the developing unit 24 is inserted into and removed from the image forming apparatus 100 from the outside of the apparatus main body.

The drum units 23Y, 23M, 23C, and 23K (hereinafter, also collectively and simply referred to as a "drum unit 23") including the photosensitive drums 2 are attached to the image forming apparatus 100. The drum unit 23 is a cartridge to be replaced by an operator such as a user or a maintenance person. The drum unit 23 rotatably supports the photosensitive drum 2. Specifically, the photosensitive drum 2 is rotatably supported by a frame body of the drum unit 23. The drum unit 23 may not include the charging roller 3 or the cleaning apparatus.

In addition, the developing units 24Y, 24M, 24C, and 24K (hereinafter, also collectively and simply referred to as a "developing unit 24") separate from the drum unit 23, which is a photoreceptor unit, are attached to the image forming apparatus 100. The developing unit 24 includes developing sleeves 5Y, 5M, 5C, and 5K (hereinafter, also collectively and simply referred to as a "developing sleeve 5") as developer bearers that bear a developer, and screws 7Y, 7M, 7C, and 7K (hereinafter, also collectively and simply referred to as a "screw 7") that supply the developer to the developing sleeve 5 and stir the developer. The developing unit 24 is a cartridge in which the developing sleeve 5 and the screw 7 are integrated, and is detached from the apparatus main body of the image forming apparatus 100 and replaced by the operator as illustrated in FIGS. 5 and 7.

Here, the toner is circulated and conveyed at high speed by the screw 7 inside the developing unit 24. A rotation speed of the screw 7 is relatively very high with respect to a rotation speed of the developing sleeve 5 and the photosensitive drum 2, and coating on the developing sleeve 5 can be uniformly performed without unevenness.

Figure 8:
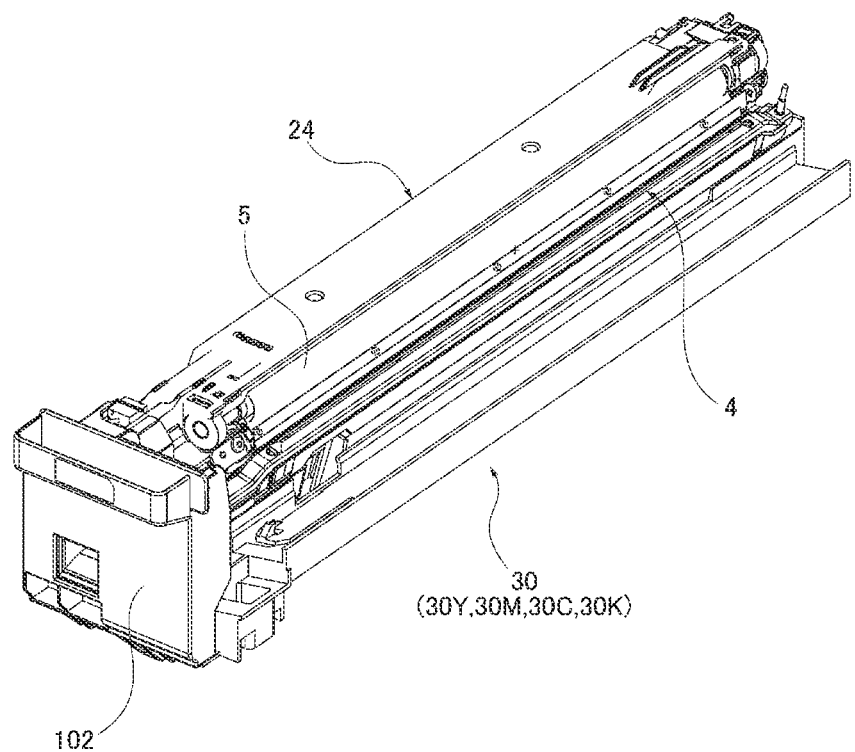
FIG. 8 is a perspective view of a cartridge tray.
Figure 9:
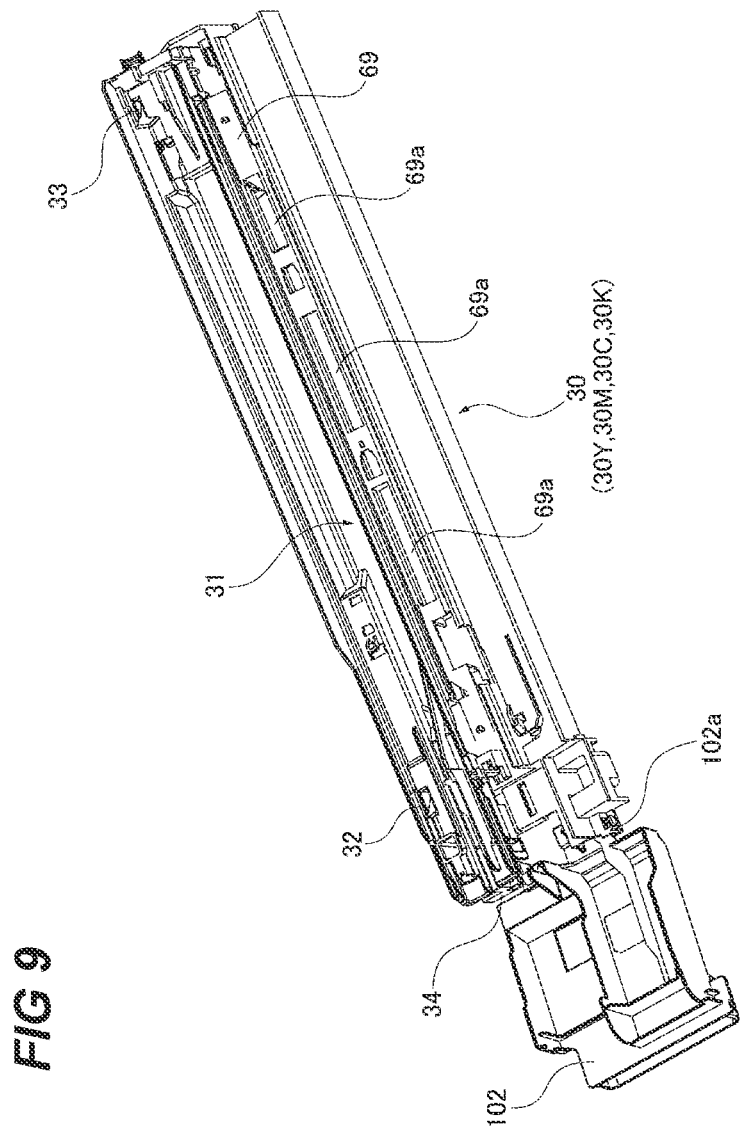
FIG. 9 is a perspective view of the cartridge tray.

In addition, the image forming apparatus 100 includes a cartridge tray 30 (30Y, 30M, 30C, and 30K) for each image forming unit (see FIGS. 8 and 9). The drum unit 23 and the developing unit 24 are supported by the cartridge tray 30 of each image forming unit, guided in an axial direction of the photosensitive drum, and inserted into and removed from the apparatus main body of the image forming apparatus 100.

One of the cartridge trays 30 is attached to a back plate 100B (see FIG. 18) and the other is attached to a front plate 100F (see FIG. 18) in the axial direction of the photosensitive drum. The back plate 100B is formed of a sheet metal, and forms a part of a housing of the apparatus main body on a deep side of the apparatus main body of the image forming apparatus 100. The front plate 100F is formed of a sheet metal, and forms a part of a housing of the apparatus main body on a front side of the apparatus main body of the image forming apparatus 100. The back plate 100B and the front plate 100F are disposed to face each other on one side and the other side in the axial direction of the photosensitive drum, and a sheet metal (not illustrated) as a beam is bridged therebetween. Each of the back plate 100B, the front plate 100F, and the beam (not illustrated) configures a part of a frame body (housing) of the image forming apparatus. Here, regarding the image forming apparatus of the present embodiment or the constituent members thereof, the front surface side or the front side is a side on which the drum unit 23 and the developing unit 24 are taken in and out (inserted and removed) with respect to the apparatus main body of the image forming apparatus 100.

Since the drum unit 23 and the developing unit 24 deteriorate due to repetition of the image forming process, they take a form of a unit (cartridge) that can be maintained by replacement or attachment/detachment.

FIG. 3 illustrates an arrangement of the drum unit 23, the developing unit 24, and the exposure head 4 when replacement or attachment/detachment is performed. In the image forming apparatus illustrated in FIG. 3, unlike the image forming apparatus illustrated in FIG. 2, it can be seen that the developing unit 24 and the exposure head 4 are retracted and separated from the photosensitive drum 2.

This is because, when the state in which the developing unit 24 or the exposure head 4 is disposed close to the photosensitive drum 2 as illustrated in FIG. 2 is maintained, each unit may be damaged due to dynamic interference at the time of attachment/detachment of the unit, or the unit may not be taken out.

Therefore, at the time of attaching and detaching the unit, the developing unit 24 and the exposure head 4 are retracted and separated from the photosensitive drum 2 as illustrated in FIG. 3 by a retraction mechanism by a developing stay 31, a rotating arm 65, a lifting/lowering duct 69, and the like, which will be described later.

The drum unit 23 and the developing unit 24 are inserted into and removed from the front side of the image forming apparatus 100 respectively, and are attached at predetermined positions (attachment positions) of the apparatus main body of the image forming apparatus 100.

The image forming apparatus 100 includes inner doors 102Y, 102M, 102C, and 102K (hereinafter, also collectively and simply referred to as an "inner door 102") that cover front sides of both the drum unit 23 and the developing unit 24 attached at the attachment positions. As illustrated in FIGS. 8 and 9, the inner door 102 has a rotation shaft 102a pivotally supported on the front side of the cartridge tray 30, and is rotatable within a predetermined range with respect to the cartridge tray 30. That is, the inner door 102 is provided so as to be openable and closable with respect to the image forming apparatus.

The inner door 102 is a member necessary for protecting each unit and making it difficult for the photosensitive drum 2 to be exposed to light in a process other than the image forming process, and is disposed at a position facing the front surface of each color unit in the attachment/detachment direction.

Furthermore, a front cover 101 forming an exterior of the apparatus is provided on the front side of the image forming apparatus 100. One end of the front cover 101 is fixed to the front side of the apparatus main body of the image forming apparatus 100 by a hinge, and is rotatable with respect to the apparatus main body of the image forming apparatus 100 by the hinge. The front cover 101 is provided on the front side of the inner door 102 in the axial direction of the photosensitive drum. In the closed state illustrated in FIG. 1, the front cover 101 covers the entire plurality of inner doors 102 arranged in a left-right direction to form an exterior on the front side of the apparatus.

Therefore, replacement work of the drum unit 23 and the developing unit 24 is performed by the operator in the following procedure. The operator opens the front cover 101 as illustrated in FIG. 4, then opens the inner door 102 as illustrated in FIG. 5, and takes out the drum unit 23 (FIG. 6) or the developing unit 24 (FIG. 7) in the apparatus main body. Then, the replacement work is completed by inserting a new drum unit 23 or a new developing unit 24, closing the inner door 102, and further closing the front cover 101.

The retraction mechanism of the developing unit 24 and the exposure head 4 retracts the developing unit 24 and the exposure head 4 from the photosensitive drum 2 in conjunction with the operation of opening the inner door 102. The retraction mechanism (developing stay 31, rotating arm 65, and lifting/lowering duct 69) will be described later.

Here, in the following description, the front plate side is defined as a front side (front side or front surface side), and the back plate side is defined as a back side (deep side or rear surface side) with respect to the apparatus main body. When the photosensitive drum 2K on which an electrostatic latent image related to a black toner image is formed is used as a reference, a side on which the photosensitive drum 2Y on which an electrostatic latent image related to a yellow toner image is formed is disposed is defined as a left side. When the photosensitive drum 2Y on which the electrostatic latent image related to the yellow toner image is formed is used as a reference, a side on which the photosensitive drum 2K on which the electrostatic latent image related to the black toner image is formed is disposed is defined as a right side. Furthermore, a direction perpendicular to the front-back direction and the left-right direction defined here and upward in a vertical direction is defined as an upward direction, and a direction perpendicular to the front-back direction and the left-right direction defined here and downward in the vertical direction is defined as a downward direction. The defined forward direction F, backward direction B, rightward direction R, leftward direction L, upward direction U, and downward direction D are illustrated in FIG. 1.

In addition, the axial direction of the photosensitive drum 2 described in the following description is a direction that coincides with the front-back direction (near-far direction) illustrated in FIG. 1. A longitudinal direction of the exposure head 4 also coincides with the front-back direction illustrated in FIG. 1. That is, the axial direction of the photosensitive drum 2 and the longitudinal direction of the exposure head 4 coincide with each other. In addition, one side of the photosensitive drum 2 in the axial direction means the back side defined here, and the other side means the front side defined here. One side and the other side in the front-back direction also correspond to the back side and the front side defined here. One side in the left-right direction means the left side defined here, and the other side means the right side defined here.

(Exposure Head)

Figure 10:
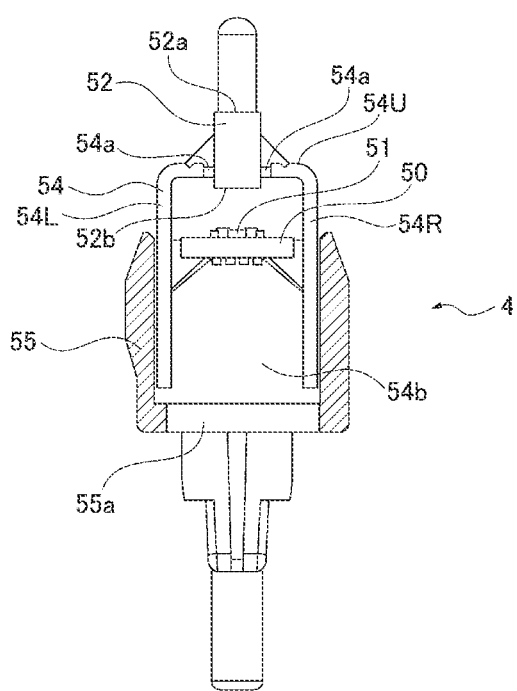
FIG. 10 is a cross-sectional view of an exposure head.
Figure 11:
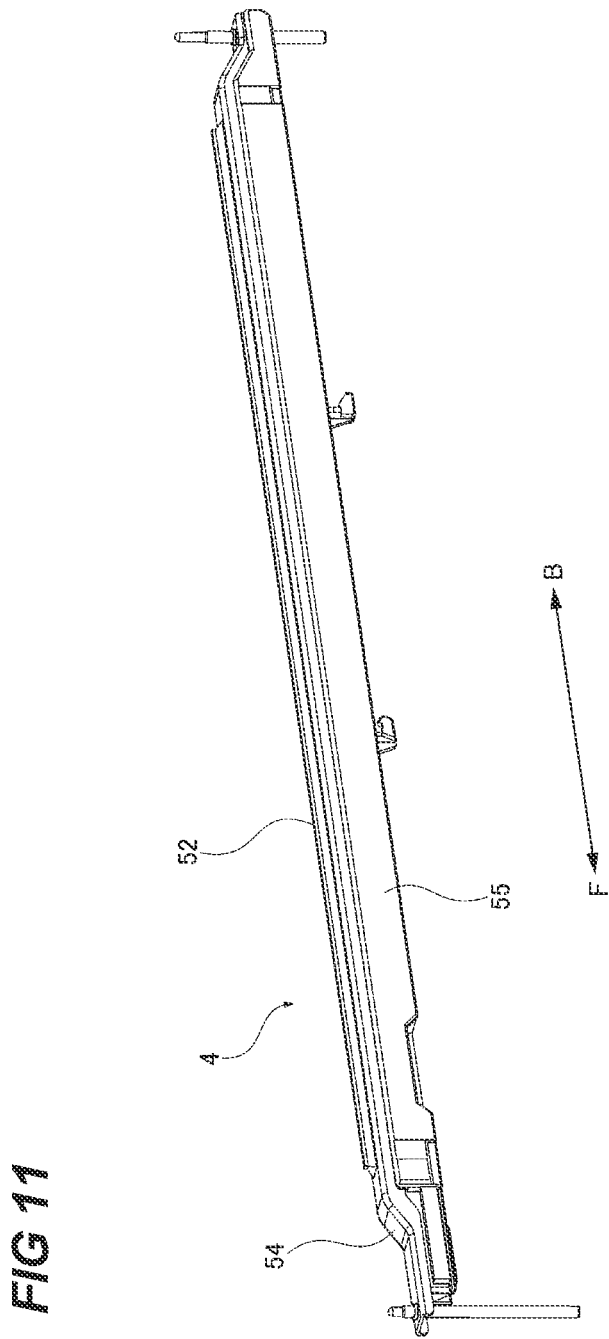
FIG. 11 is a perspective view of the exposure head.
Figure 12:
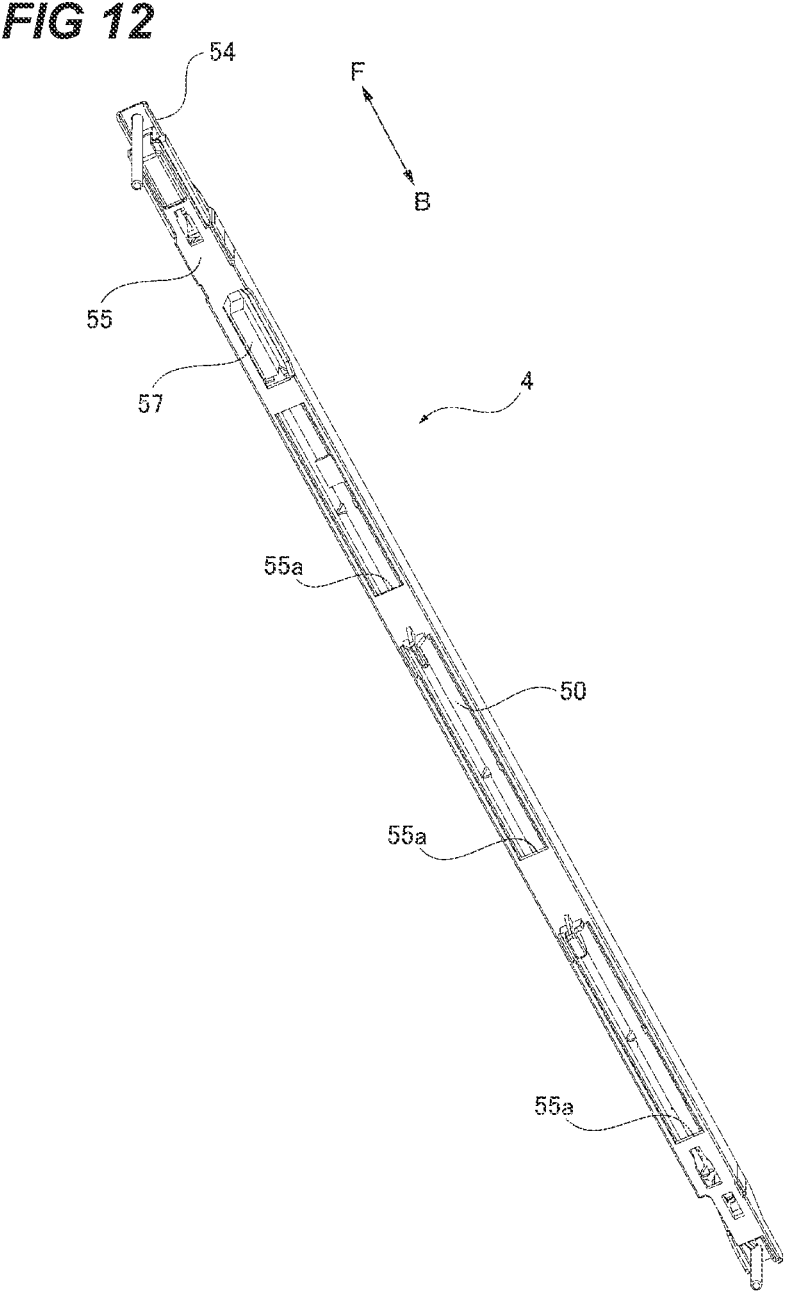
FIG. 12 is a perspective view of the exposure head.

Next, the exposure head 4 will be described with reference to FIGS. 10 to 12. FIG. 10 is a schematic cross-sectional view of the exposure head 4 included in the image forming apparatus of the present embodiment. FIG. 11 is a perspective view of the exposure head 4 as viewed from above. FIG. 12 is a perspective view of the exposure head 4 as viewed from below.

The exposure head 4 has an elongated shape (longitudinal shape) extending in the axial direction of the photosensitive drum 2. The exposure head 4 includes a substrate 50, a light emitting element mounted on the substrate 50, a lens array 52, and a holding member that holds the substrate 50 and the lens array 52. The holding member includes a housing 54 to be described later and a housing support member 55 that supports the housing 54. Here, the exposure head 4 includes an LED (light emitting diode) 51 as a light emitting element that emits light.

(Substrate and Lens Array)

Figure 13A:
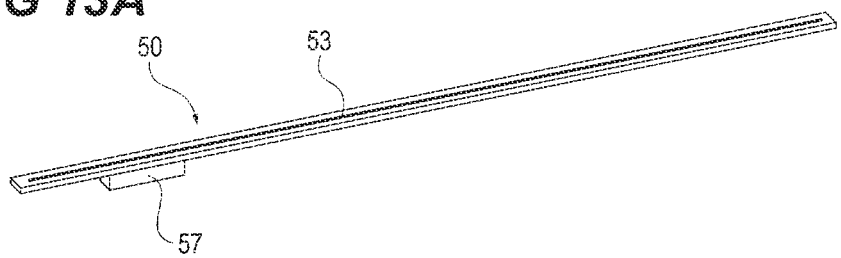
FIGS. 13A, 13B, and 13C are views illustrating a substrate in the exposure head.
Figure 13B:
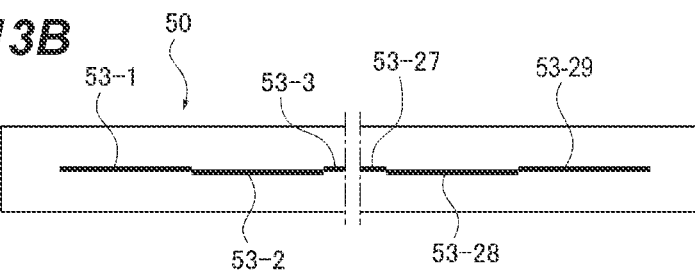
Figure 13C:
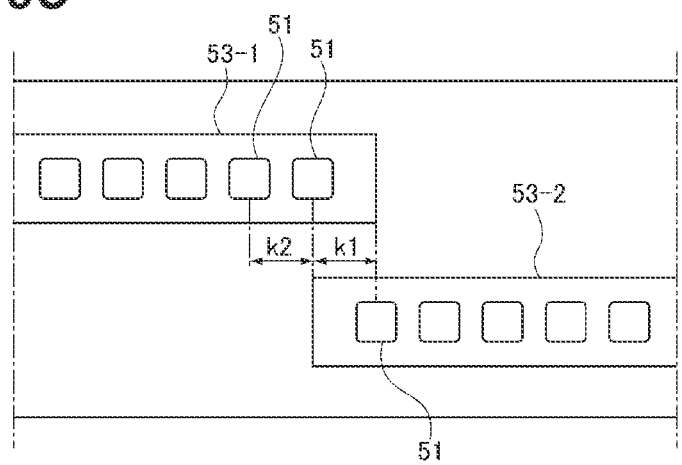

Here, the substrate 50 and the lens array 52 of the exposure head 4 will be described with reference to FIGS. 13A to 13E. First, the substrate 50 will be described. FIG. 13A is a schematic perspective view of the substrate 50. FIG. 13B illustrates an arrangement of a plurality of LEDs 51 provided on the substrate 50, and FIG. 13C illustrates an enlarged view of FIG. 13B.

An LED chip 53 is mounted on the substrate 50. As illustrated in FIG. 13A, the LED chip 53 is provided on one surface of the substrate 50, and an elongated connector 57 is provided on the other surface. Here, one surface of the substrate 50 is a surface (upper surface, surface) on a side where the LED chip 53 is provided. The other surface of the substrate is a surface (lower surface, rear surface) opposite to the side on which the LED chip 53 is provided.

The connector 57 is attached to the other surface (lower surface, rear surface) of the substrate 50 such that the longitudinal direction thereof is along the longitudinal direction of the substrate 50. The elongated connector 57 is provided on the front side of the image forming apparatus 100 (one side of the substrate 50 in the longitudinal direction). Wiring for supplying a signal to each LED chip 53 is provided on the substrate 50. One end of a flexible flat cable (hereinafter, see FFC 58 and FIG. 21) as an example of a cable is coupled to the connector 57.

Note that a control circuit unit of the image forming apparatus 100 is provided with a substrate (not illustrated) including a controller and a connector. The other end of the FFC 58 is coupled to the connector. That is, the FFC 58 electrically couples the substrate (control circuit unit) of the apparatus main body and the substrate 50 of the exposure head 4. A control signal (drive signal) is input to the substrate 50 of the exposure head 4 from the control circuit unit of the apparatus main body of the image forming apparatus 100 via the FFC 58 and the connector 57. The control signal is transferred to each LED chip 53 mounted on the substrate 50. The LED chip 53 is driven (light emission, turn-off operation) by the control signal input to the substrate 50.

The LED chip 53 mounted on the substrate 50 will be described in more detail. As illustrated in FIGS. 13B and 13C, LED chips 53-1 to 53-29 (29 chips) in which a plurality of LEDs 51 (an example of light emitting element) are arranged are arranged on one surface of the substrate 50. In each of the LED chips 53-1 to 53-29, 516 LEDs 51 are arranged in the longitudinal direction. In the longitudinal direction of the LED chip 53, a center-to-center distance k2 between the adjacent LEDs 51 corresponds to a recording resolution of the image forming apparatus 100. Since the recording resolution of the image forming apparatus 100 of the present embodiment is 1200 dpi, the LEDs 51 are arranged such that the center-to-center distance k2 of the adjacent LEDs 51 is 21.16 µm in the longitudinal direction of the LED chips 53-1 to 53-29. Therefore, an exposure range of the exposure head 4 of the present embodiment is about 314 mm. A length of a photosensitive layer of the photosensitive drum 2 in the axial direction is 314 mm or more. Since a length of a long side of an A4-size recording sheet and a length of a short side of an A3-size recording sheet are 297 mm, the exposure head 4 of the present embodiment has an exposure range in which an image can be formed on the A4-size recording sheet and the A3-size recording sheet.

The plurality of LED chips 53-1 to 53-29 are arranged in a staggered manner in the axial direction of the photosensitive drum 2. Specifically, the LED chips 53-1 to 53-29 are alternately arranged in two rows along the axial direction of the photosensitive drum 2. That is, as illustrated in FIG. 13B, odd-numbered LED chips 53-1, 53-3, . . . , 53-29 counted from the left side are mounted in a row in the longitudinal direction of the substrate 50. Further, even-numbered LED chips 53-2, 53-4, . . . , 53-28 counted from the left side are mounted in a row in the longitudinal direction of the substrate 50. The LED chips 53 are arranged in this manner. As a result, as illustrated in FIG. 13C, in the longitudinal direction of the LED chip 53, a center-to-center distance k1 of the LEDs 51 arranged at one end of one LED chip 53 and the other end of the other LED chip 53 in the different adjacent LED chips 53 can be made equal to the center-to-center distance k2 of the adjacent LEDs 51 on one LED chip 53.

In the present embodiment, the light emitting element is a semiconductor LED which is a light emitting diode, but may be, for example, an organic light emitting diode (OLED). This OLED is also called organic electro-luminescence (EL), and is a current-driven light emitting element. The OLEDs are arranged on a line along a main scanning direction (axial direction of the photosensitive drum 2) on a thin film transistor (TFT) substrate, for example, and are electrically coupled in parallel by power supply wiring similarly provided along the main scanning direction.

Figure 13D:
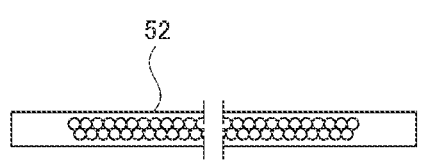
FIGS. 13D and 13E are views illustrating a lens array.
Figure 13E:
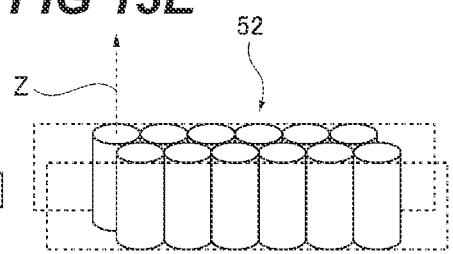

Next, the lens array 52 which is a lens assembly will be described. FIG. 13D is a schematic view of the lens array 52 as viewed from the photosensitive drum 2 side. FIG. 13E is a schematic perspective view of the lens array 52. As illustrated in FIG. 13D, the lens array 52 condenses light emitted from the light emitting element on the photosensitive drum 2. The lens array 52 is a lens assembly including a plurality of lenses. The plurality of lenses is arranged in two rows along the arrangement direction of the plurality of LEDs 51. Each lens is alternately arranged such that one of the lenses in the other row is arranged so as to be in contact with both of the adjacent lenses in the arrangement direction of the lenses in one row. Each lens is a cylindrical rod lens made of glass, and has a light incident surface 52b on which light emitted from the LED 51 is incident and a light emitting surface 52a from which the light incident from the light incident surface is emitted (see FIG. 10). The material of the lens is not limited to glass, and may be plastic. The shape of the lens is not limited to the cylindrical shape, and may be, for example, a polygonal prism such as a hexagonal prism.

A dotted line Z illustrated in FIG. 13E indicates the optical axis of the lens. The exposure head 4 is moved in a direction (hereinafter, also referred to as an optical axis direction) substantially along the optical axis of the lens indicated by the dotted line Z by a moving mechanism (a rotating arm 65 and a lifting/lowering duct 69 illustrated in FIG. 14) to be described later. The optical axis of the lens here means a line connecting a center of the light emitting surface of the lens and a focal point of the lens. The lens array 52 is a lens assembly having a plurality of lenses, and the "optical axis" described above is an optical axis of an arbitrary lens among the plurality of lenses. Here, strictly speaking, the plurality of lenses included in the lens array 52 may be slightly inclined to each other. This is due to tolerance during assembly. However, the deviation of the tolerance here is not considered when the direction of the optical axis is defined. Therefore, it is considered that the optical axes of the plurality of lenses are in the same direction. Radiation light emitted from the LED 51 is incident on the lens included in the lens array 52. The lens has a function of condensing the incident radiation light on the surface of the photosensitive drum 2.

An attachment position of the lens array 52 with respect to the housing 54 is adjusted at the time of assembling the exposure head 4 such that a distance between the light emitting surface of the LED 51 and the light incident surface of the lens is substantially equal to a distance between the light emitting surface of the lens and the surface of the photosensitive drum 2.

(Housing)

As illustrated in FIG. 10, the housing 54 holds the lens array 52 and the substrate 50. In the present embodiment, the housing 54 is a metal member formed by bending a plate material obtained by plating a galvanized steel plate or a cold-rolled steel plate. For example, the housing 54 is formed by pressing a sheet metal such as an iron thin plate into a U-shape.

The housing 54 has a flat surface portion (opposing surface) 54U in which a first opening 54a into which the lens array 52 is inserted is formed. The flat surface portion 54U faces the photosensitive drum 2 in the optical axis direction of the lens of the lens array 52. Note that the flat surface portion 54U is not limited to a flat surface, and may be a slightly curved surface. The housing 54 has an extending portion 54R extending in a direction away from the photosensitive drum 2 from one side of the flat surface portion 54U in the lateral direction. The housing 54 has an extending portion 54L extending in a direction away from the photosensitive drum 2 from the other side of the flat surface portion 54U in the lateral direction.

The extending portion 54R and the extending portion 54L form substrate support portions for supporting the substrate 50 inserted from a second opening 54b in the housing 54. The flat surface portion 54U and the substrate support portions (extending portions 54R and 54L) are integrated to form the housing 54 that holds the lens array 52 and the substrate 50, and a cross section thereof is formed in a substantially U-shape. Since the housing 54 is formed in a substantially U-shape, the second opening 54b is formed on a side opposite to the flat surface portion 54U. The second opening 54b is formed between the substrate support portions (extending portions 54L and 54R) extending from the flat surface portion 54U to the side away from the photosensitive drum.

The substrate 50 is inserted from the second opening 54b, that is, from the lower side of the U-shaped housing 54, and is adhered to the inside of each substrate support portion (the inside of the extending portion 54L and the inside of the extending portion 54R) with an adhesive.

In addition, the lens array 52 is also adhered to the flat surface portion 54U with an adhesive in a state of being inserted into the first opening 54a formed in the flat surface portion 54U. Note that the lens array 52 is fixed to the flat surface portion 54U (housing 54) after the position and inclination in a focusing direction are adjusted by a jig such that a distance between all the LED chips 53 mounted on the substrate 50 and the lens array 52 in the focusing direction becomes a predetermined value. The lens array 52 is fixed to the flat surface portion 54U at a plurality of positions in the longitudinal direction by an adhesive.

(Housing Support Member)

As illustrated in FIGS. 11 and 12, the housing support member 55 supports the housing 54 holding the substrate 50 and the lens array 52 in the longitudinal direction, and is provided integrally with the housing 54. The housing support member 55 is a member having a longitudinal shape extending in the axial direction of the photosensitive drum 2. The housing support member 55 is formed in a U-shape as illustrated in FIG. 10. The housing support member 55 is provided with a plurality of openings 55a in the longitudinal direction that is the axial direction of the photosensitive drum 2.

The opening 55a of the housing support member 55 is provided at a position facing a surface (rear surface of the substrate 50) of the substrate 50 opposite to the mounting surface (front surface of the substrate 50) on which the LED 51 is mounted.

Since the housing support member 55 is provided integrally with the housing 54, the airflow sent from the duct unit 60 is blown onto the rear surface of the substrate 50 through the opening 55a of the housing support member 55. Moreover, the airflow blown onto the rear surface of the substrate 50 is blown in a direction orthogonal to the rear surface of the substrate 50.

As described above, the airflow blown from the opening 55a of the housing support member 55 to the rear surface of the substrate 50 is separated from the developing unit 24 and the drum unit 23 adjacent to the exposure head 4 by the housing support member 55. Therefore, the airflow for cooling the exposure head 4 introduced into the rear surface of the substrate 50 does not leak to the side of the developing unit 24 adjacent to the exposure head 4, and the toner of the developing unit 24 can be suppressed from scattering inside the image forming apparatus.

As described above, the housing support member 55 is provided over the longitudinal direction which is the axial direction of the photosensitive drum 2, and has the opening 55a at a position facing the rear surface of the substrate 50. Thus, the housing support member 55 of the exposure head 4 forms a duct (closed space) that blows the airflow from the duct unit 60 onto the rear surface of the substrate 50 through the opening 55a and circulates the airflow in the longitudinal direction of the substrate 50, that is, a part of the duct that cools the exposure head 4.

As described above, the exposure head 4 is configured as an integrated head unit by the substrate including the LED, the lens array including the plurality of lenses, the housing 54, and the housing support member 55.

(Lifting/Lowering Duct)

Figure 17:
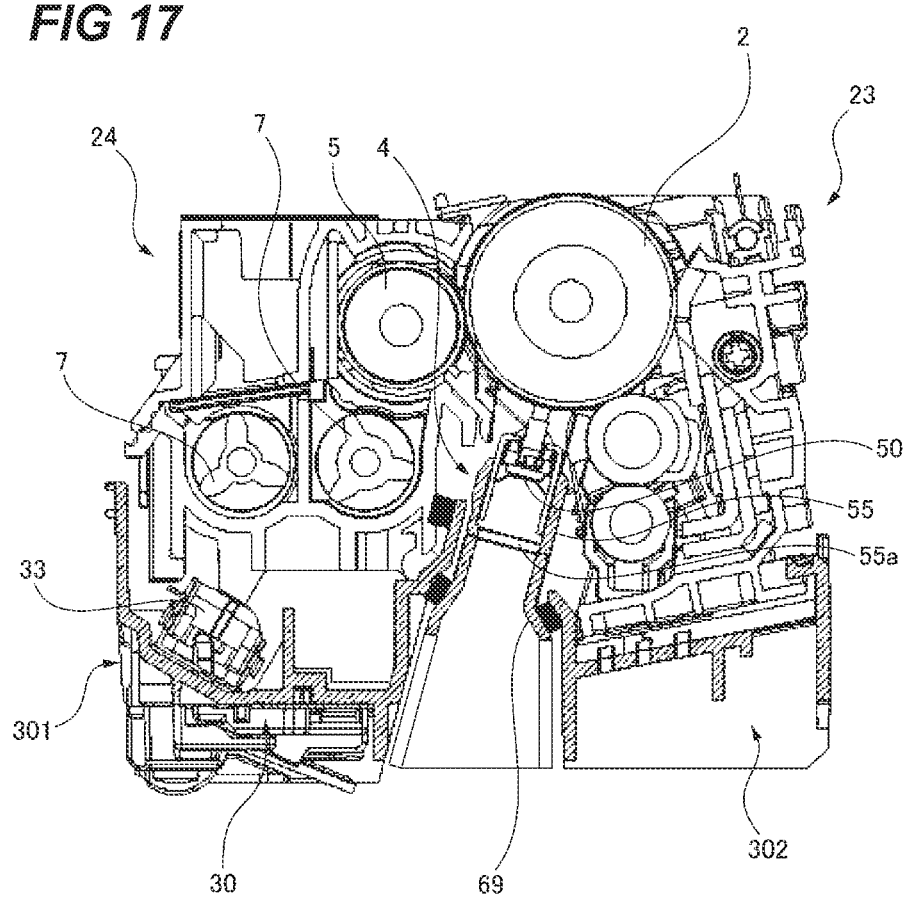
FIG. 17 is a cross-sectional view taken along a line X-X in FIG. 14.

The image forming apparatus 100 includes a lifting/lowering duct 69 (see FIGS. 9 and 17). The lifting/lowering duct 69 is an exposure support member that attachably/detachably supports the exposure head 4, and is provided in the apparatus main body of the image forming apparatus 100 together with a cartridge tray 30 described later.

The lifting/lowering duct 69 is provided between a developing support member 301 that supports a developing unit 24 of the cartridge tray 30 to be described later and a drum support member 302 that supports the drum unit 23. The lifting/lowering duct 69 is provided between the developing support member 301 and the drum support member 302 of the cartridge tray 30 so as to be movable to an exposure position (see FIG. 17) at which the photosensitive drum 2 is exposed and a retracted position retracted from the exposure position. Both end portions of the lifting/lowering duct 69 in the longitudinal direction are supported from below by the rotating arm 65. The lifting/lowering duct 69 is moved in a direction (moving direction) orthogonal to the axial direction of the photosensitive drum 2 integrally with the exposure head 4 by the rotating arm 65. The lifting/lowering duct 69 is moved to the exposure position or the retracted position by the rotation of the rotating arm 65.

The lifting/lowering duct 69 has a longitudinal shape extending in the front-back direction (the axial direction of the photosensitive drum) similarly to the exposure head 4 so as to be able to support the entire exposure head 4, and a central portion thereof has a shape having openings in the vertical direction. The lifting/lowering duct 69 forms a duct in which one opening 69a (see FIG. 9) communicates with the opening 55a of the exposure head 4 and the other opening 64 (see FIG. 14) communicates with the opening 61 (see FIG. 19) of the duct unit 60. The lifting/lowering duct 69 supports the exposure head 4 and, at the same time, forms a part of a duct that communicates the exposure head 4 and the duct unit 60 to form a flow path of an airflow for cooling the exposure head 4.

The lifting/lowering duct 69 is formed in a hollow shape having no opening at a position facing the developing unit 24 and the drum unit 23 and having openings (the opening 69a and the opening 64) in the vertical direction. The lifting/lowering duct 69 forms an exposure duct that communicates the exposure head 4 and the duct unit 60 to form a space for circulating air for cooling the exposure head 4.

Accordingly, the lifting/lowering duct 69 circulates the airflow from the duct unit 60 to be described later with respect to the rear surface of the substrate 50 of the exposure head 4 through the openings (the opening 69a and the opening 64) described above. Therefore, the lifting/lowering duct 69 can circulate the airflow from the duct unit 60 with respect to the rear surface of the substrate 50 of the exposure head 4 without leaking the airflow to the side of the adjacent developing unit 24 or drum unit 23, and the scattering of the toner inside the apparatus can be reduced.

Figure 14:
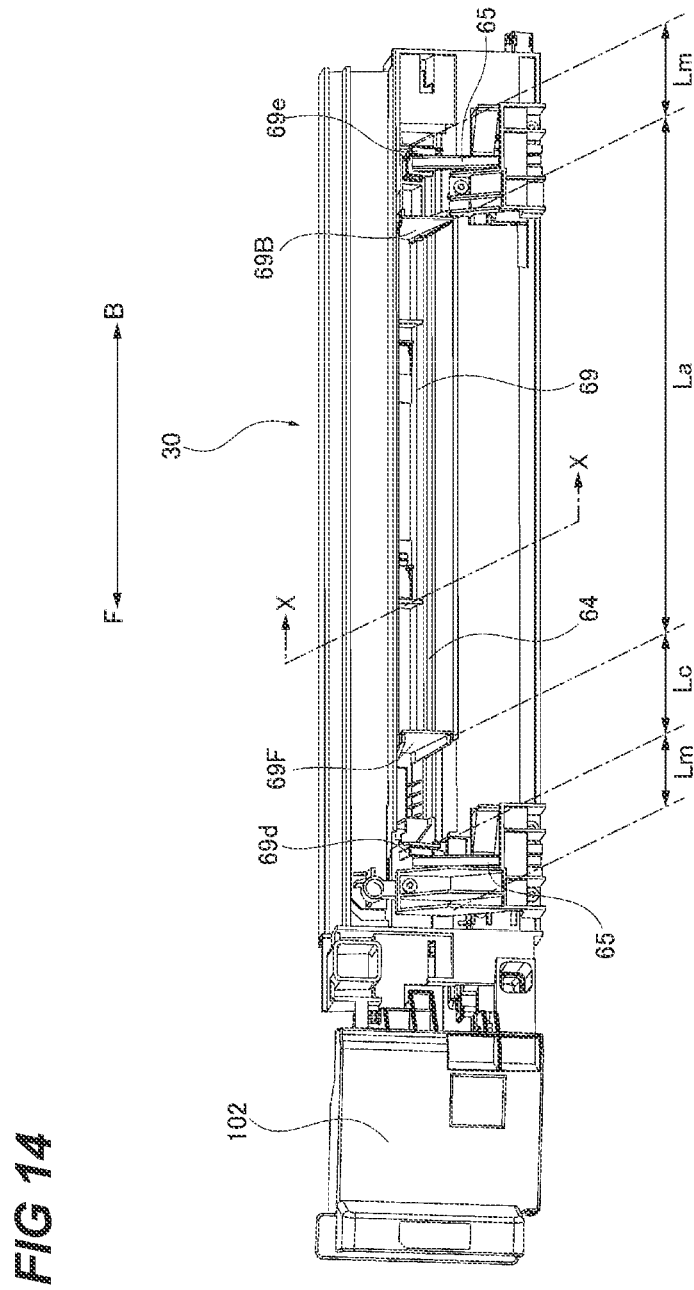
FIG. 14 is a perspective view of the cartridge tray.

As illustrated in FIG. 14, the lifting/lowering duct 69 has a first engagement portion 69d and a second engagement portion 69e that engage with the rotating arm 65 at both end portions in the longitudinal direction. The first engagement portion 69d is provided outside the openings (the opening 64 and the opening 69a) of the lifting/lowering duct 69 on one end side in the longitudinal direction. The second engagement portion 69e is provided outside the openings (the opening 64 and the opening 69a) of the lifting/lowering duct 69 on the other end side in the longitudinal direction.

Therefore, a region (range Lm on the front side) where the first engagement portion 69d is provided and a region (range Lm on the back side) where the second engagement portion 69e is provided are provided outside a duct region (range La) where the openings (the opening 64 and the opening 69a) of the lifting/lowering duct 69 are surrounded by duct walls 69F and 69B. In other words, the duct region (range La) where the openings of the lifting/lowering duct 69 are surrounded by the duct walls 69F and 69B is provided between the region (range Lm on the front side) where the first engagement portion 69d is provided and the region (range Lm on the back side) where the second engagement portion 69e is provided.

A range Lc illustrated in FIG. 14 is a region where the connector 57 of the exposure head 4 is provided, and is provided outside the duct region indicated by the range La and between the duct region and the region where the first engagement portion 69d indicated by the range Lm on the front side is provided.

In addition, the range La forming the duct includes most of the substrate 50 on which the LED 51 is mounted, and the exposure head 4 can be sufficiently cooled by blowing the airflow to the range La. The range Lc is a mounting portion of the connector 57 of the signal line that transmits the drive signal to the substrate 50 on which the LED 51 is mounted. The range Lc is not provided with an opening for forming a duct, but is configured to enable necessary and sufficient cooling in the range La as described above.

As a result, the air taken in from the outside of the apparatus by the duct unit 60 to be described later is blown onto the rear surface of the substrate 50 from the opening 55a of the exposure head 4 through the lifting/lowering duct 69 (see FIG. 20). The airflow blown from the opening 55a of the exposure head 4 onto the rear surface of the substrate 50 is exhausted to the outside of the apparatus by the duct unit 60 through the lifting/lowering duct 69.

(Cartridge Tray)

The image forming apparatus 100 includes a cartridge tray 30. The cartridge tray 30 will be described with reference to FIGS. 8, 9, and 14. FIGS. 8, 9, and 14 are perspective views of the cartridge tray 30.

The cartridge tray 30 is a support member that supports the drum unit 23 and the developing unit 24 described above, and guides and supports the attaching and detaching operation along the axial direction of the photosensitive drum 2. The cartridge tray 30 pivotally supports the rotation shaft 102a of the inner door 102 such that the inner door 102 is rotatable within a predetermined range.

The cartridge tray 30 is provided for each image forming unit. Each cartridge tray 30 includes the developing support member 301 that guides and supports the attaching and detaching operation of the developing unit 24 along the axial direction of the photosensitive drum 2, and the drum support member 302 that guides and supports the attaching and detaching operation of the drum unit 23 along the axial direction of the photosensitive drum 2. The developing support member 301 and the drum support member 302 are members having a longitudinal shape extending in the axial direction of the photosensitive drum 2. In the cartridge tray 30, the developing support member 301 and the drum support member 302 are integrally formed. Note that the cartridge tray 30 is not limited to the configuration provided for each image forming unit.

The lifting/lowering duct 69 is movably disposed between the developing support member 301 and the drum support member 302 of the cartridge tray 30. Both ends of the lifting/lowering duct 69 in the longitudinal direction are supported by the rotating arm 65 from below between the developing support member 301 and the drum support member 302. The rotating arm 65 is rotatably provided on the developing support member 301 of the cartridge tray 30. The exposure head 4 is detachably attached to the lifting/lowering duct 69 movably disposed on the cartridge tray 30. In other words, the cartridge tray 30 is a support member that supports the exposure head 4, and guides and supports the attaching and detaching operation along the axial direction of the photosensitive drum 2.

(Developing Stay)

Figure 15:
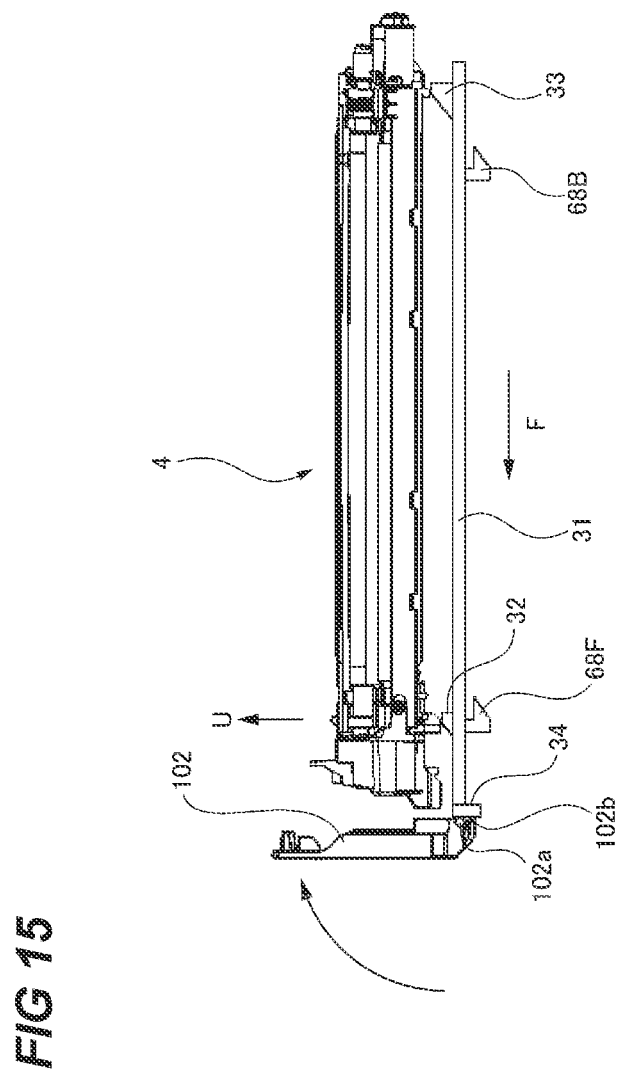
FIG. 15 is a side view of a developing stay.
Figure 16:
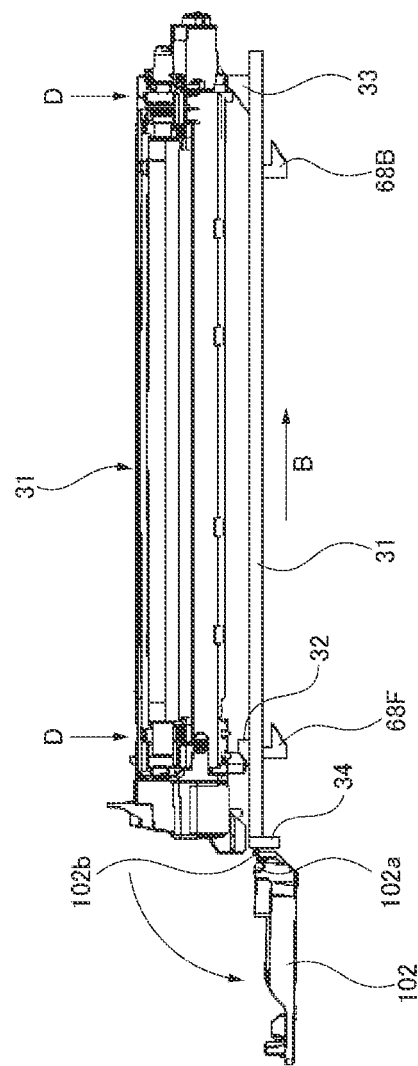
FIG. 16 is a side view of the developing stay.

The image forming apparatus 100 includes the developing stay 31 slidable along the axial direction of the photosensitive drum 2. The developing stay 31 will be described with reference to FIGS. 15, 16, and 17. FIGS. 15 and 16 are side views of the developing stay 31 as viewed from the rightward direction. FIG. 17 is a cross-sectional view taken along a line X-X in FIG. 14.

In FIG. 15, the inner door 102 is in a closed state, the developing unit 24 is at a position close to the photosensitive drum 2, and the exposure head 4 is at an exposure position close to the photosensitive drum 2. In FIG. 16, the inner door 102 is in an open state, the developing unit 24 is at a position retracted from the photosensitive drum 2, and the exposure head 4 is at a retracted position retracted from the exposure position.

The developing stay 31 as a slide member is provided to be movable in the axial direction of the photosensitive drum 2. The developing stay 31 moves in one direction in the axial direction in conjunction with the opening operation of the inner door 102, and moves in the other direction in the axial direction in conjunction with the closing operation of the inner door 102. The developing stay 31 is provided movably with respect to the developing support member 301 of the cartridge tray 30. The developing stay 31 has an elongated shape (longitudinal shape) extending in the axial direction of the photosensitive drum 2, and includes a developing pressurizing frame 32, a developing pressurizing frame 33, a developing stay link 34, an arm retreating member 68F, and an arm retreating member 68B.

The developing stay link 34 is fixed to a front end portion of the developing stay 31 and is engaged with the inner door 102 pivotally supported by the cartridge tray 30. The developing pressurizing frame 32 is fixed to the front side of the developing stay 31 in the longitudinal direction, and the developing pressurizing frame 33 is fixed to the back side of the developing stay 31 in the longitudinal direction. The developing pressurizing frame 32 and the developing pressurizing frame 33 are provided at positions facing the developing unit 24.

The developing pressurizing frames 32 and 33 are developing engagement members that are moved in the same direction by the movement of the developing stay 31 and engage with the developing unit 24. The developing pressurizing frames 32 and 33 are engaged with the developing unit 24 to move the developing unit 24 to a developing position close to the photosensitive drum 2 (see FIG. 15) or a separated position separated from the photosensitive drum 2 (see FIG. 16).

The inner door 102 includes a link engagement portion 102b that engages with the developing stay link 34. In the inner door 102, the link engagement portion 102b is provided on the side opposite to the portion covering the unit via the rotation shaft 102a.

As illustrated in FIG. 16, in a state where the inner door 102 is opened, the link engagement portion 102b engaged with the developing stay link 34 is located closer to the back end of the inner door 102 than the rotation shaft 102a. On the other hand, as illustrated in FIG. 15, in a state where the inner door 102 is closed, the link engagement portion 102b is located closer to the lower end of the inner door 102 than the rotation shaft 102a. Therefore, in accordance with the rotation of the inner door 102, the link engagement portion 102b of the inner door 102 moves in the rotation direction along a locus of a circle whose radius is a distance between the rotation shaft 102a and the link engagement portion 102b. That is, as illustrated in FIG. 16, by opening the inner door 102, the link engagement portion 102b also rotates and moves to the back side of the apparatus.

As a result, the developing stay link 34 engaged with the link engagement portion 102b of the inner door 102 is slid and moved in the backward direction B which is the back side of the apparatus, and the two developing pressurizing frames 32 and 33 integrally formed through the developing stay 31 are also slid and moved in the backward direction B. This means that, as illustrated in FIG. 16, the two developing pressurizing frames 32 and 33 are out of the holding position where the developing unit 24 is held. When the developing pressurizing frames 32 and 33 deviate from the holding position, the developing unit 24 moves in the downward direction D, which is a direction in which the developing unit 24 is retracted from the photosensitive drum 2 by its own weight.

From the above description, it can be seen that the developing unit 24 retracts from the photosensitive drum 2 in conjunction with the opening operation of the inner door 102. When the inner door 102 is closed, the developing unit 24 is moved in the direction of the photosensitive drum 2 and pressed through a procedure reverse to the opening operation.

In this manner, as illustrated in FIG. 15, the developing stay 31 is slid and moved in the forward direction F in conjunction with the closing operation of the inner door 102. At this time, the developing pressurizing frame 32 and the developing pressurizing frame 33 are engaged with the developing unit 24, and the developing unit 24 is moved upward (upward direction U) along the inclined surfaces of the developing pressurizing frame 32 and the developing pressurizing frame 33 of the developing stay 31. As a result, the developing sleeve 5 of the developing unit 24 is moved in a direction approaching the photosensitive drum 2 of the drum unit 23, and the developing sleeve 5 is moved to a developing position (see FIG. 17) approaching the photosensitive drum 2.

As illustrated in FIG. 16, the developing stay 31 is slid and moved in the backward direction B in conjunction with the opening operation of the inner door 102. At this time, the developing pressurizing frame 32 and the developing pressurizing frame 33 are engaged with the developing unit 24, and the developing unit 24 is moved downward (downward direction D) along the inclined surfaces of the developing pressurizing frame 32 and the developing pressurizing frame 33 of the developing stay 31. As a result, the developing sleeve 5 of the developing unit 24 is moved in a direction away from the photosensitive drum 2 of the drum unit 23, and the developing sleeve 5 is moved to a separated position separated from the photosensitive drum 2. At the time of non-development illustrated in FIG. 16, the developing sleeve 5 is separated from the photosensitive drum 2 as compared with the time of development illustrated in FIG. 15.

Furthermore, the developing stay 31 includes the arm retreating member 68F and the arm retreating member 68B for rotating the rotating arm 65 which is a rotating member. The arm retreating member 68F and the arm retreating member 68B are integrally formed with the developing stay 31. The arm retreating member 68F is fixed to the front side of the developing stay 31 in the longitudinal direction, and is provided on the surface opposite to the developing pressurizing frame 32. The arm retreating member 68B is fixed to the back side of the developing stay 31 in the longitudinal direction, and is provided on the surface opposite to the developing pressurizing frame 33. The arm retreating members 68F and 68B as engagement members are moved in the same direction by the developing stay 31 being slid and moved in the front-back direction in conjunction with the opening and closing operation of the inner door 102, and rotate the rotating arm 65.

That is, when the developing stay 31 moves in one direction (backward direction B) in the axial direction in conjunction with the opening operation of the inner door 102, the arm retreating member 68F and the arm retreating member 68B are moved in the same direction and are engaged with the rotating arm 65. As a result, the rotating arm 65 rotates in one direction to move the exposure head 4 to the retracted position integrally with the lifting/lowering duct 69. On the other hand, when the developing stay 31 moves in the other direction (forward direction F) in the axial direction in conjunction with the closing operation of the inner door 102, the arm retreating member 68F and the arm retreating member 68B are moved in the same direction, and the engagement with the rotating arm 65 is released. As a result, the rotating arm 65 rotates in the other direction to move the exposure head 4 to the exposure position integrally with the lifting/lowering duct 69.

(Rotating Arm)

As illustrated in FIG. 14, the rotating arm 65 is a rotating member that moves the exposure head 4 to the exposure position (see FIG. 17) close to the photosensitive drum 2 and the retracted position retracted from the exposure position.

The rotating arm 65, which is a rotating member, is rotatably provided on the developing support member 301 of the cartridge tray 30. One end portion of the rotating arm 65 in the left-right direction orthogonal to the axial direction of the photosensitive drum 2 is rotatably supported about an axis parallel to the axial direction. The other end portion of the rotating arm 65 in the left-right direction supports both end portions of a region (range Lm) outside the openings (the opening 69a and the opening 64) of the lifting/lowering duct 69 in the axial direction.

The rotating arm 65 presses the bottom surfaces at both ends of the lifting/lowering duct 69 in the longitudinal direction upward by a force of an arm pressure spring (not illustrated) which is a biasing member. In FIG. 17, the exposure head 4 is disposed close to the photosensitive drum 2, but this is maintained by the rotating arm 65 pressing the bottom surfaces of the both ends of the lifting/lowering duct 69 upward. This pressing is secured by a predetermined spring pressure by the arm pressure spring.

In this manner, the rotating arm 65 does not directly press the exposure head 4 but presses the lifting/lowering duct 69 that supports the exposure head 4.

Note that the operation of the rotating arm 65 that moves the exposure head 4 to the exposure position or the retracted position is powered by the sliding movement of the developing stay 31 that retracts the developing unit 24, but may be powered via another member in conjunction with the inner door 102.

(Cooling Configuration of Developing Unit)

Figure 18:
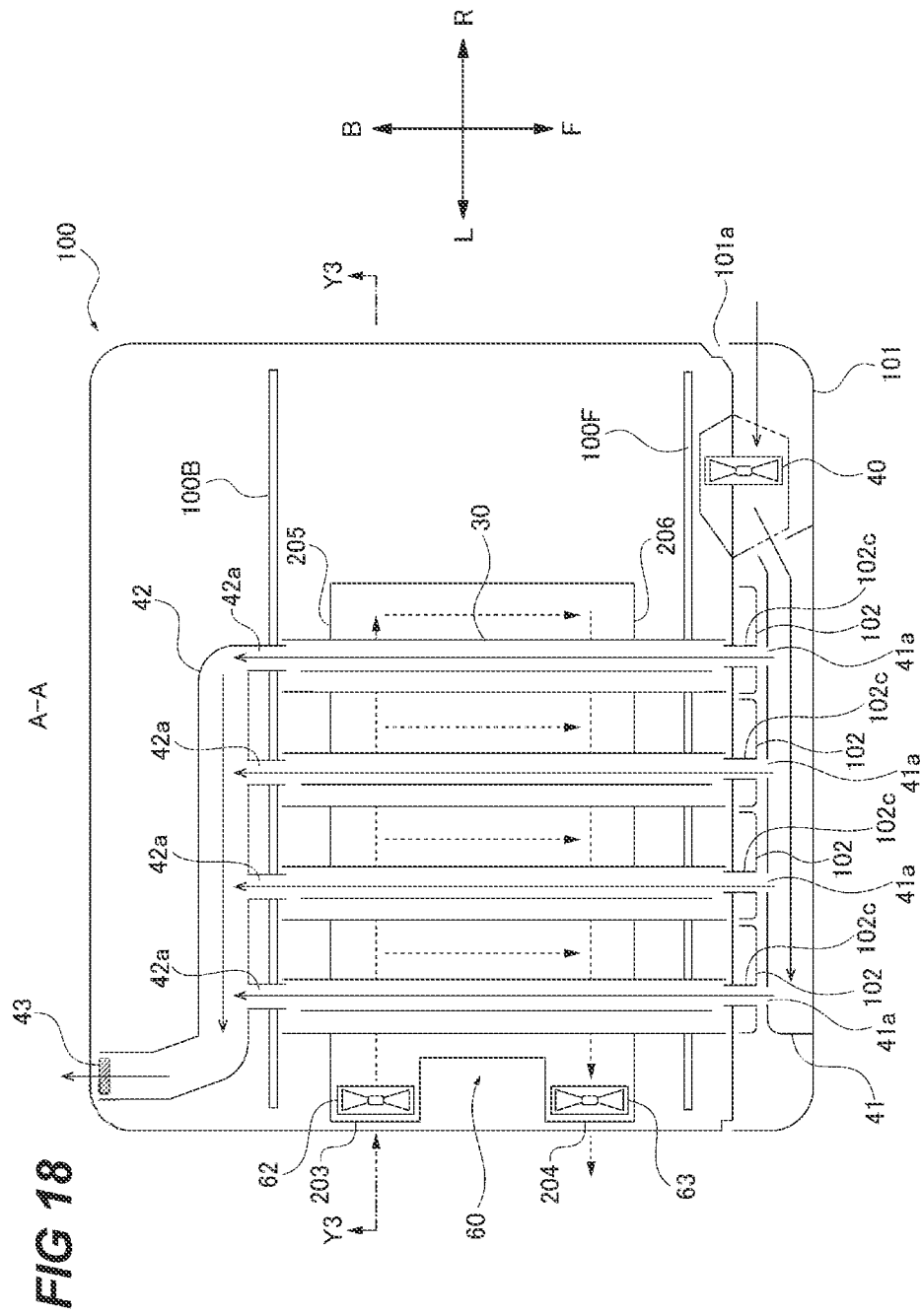
FIG. 18 is a cross-sectional view taken along line A-A in FIG. 2.

Next, a cooling configuration of the developing unit 24 will be described with reference to FIG. 18. FIG. 18 is a cross-sectional view of the image forming apparatus taken along line A-A in FIG. 2. In FIG. 18, the flow of air for cooling the developing unit 24 is indicated by a solid line, and the flow of air indicated by the solid line is also referred to as a developing cooling airflow.

The developing unit 24 contains the screw 7 rotating at a high speed and the toner circulating at a high speed as described above, and with this operation, frictional heat is generated in a bearing portion of the screw 7 and the toner, and the frictional heat is stored in the developing unit 24, and the temperature rises. When the image formation is completed, the heat storage of the developing unit 24 is completed, and the developing unit 24 is gradually cooled. However, while the image formation is continued, the heat storage is performed as long as the heat capacity of the developing unit 24 allows, and the temperature rises. Since the toner has a property of being easily melted by heat, when the temperature of the developing unit 24 rises to a certain temperature or higher, the toner is fused inside the developing unit 24, and a coating failure of the developing sleeve 5 occurs, so that the toner image is disturbed, leading to an image failure.

Therefore, there is a need for a cooling configuration of the developing unit 24 that cools the developing unit 24 so that the temperature of the developing unit 24 does not rise to a certain temperature or higher.

The image forming apparatus 100 includes a fan 40 and a front duct 41 for sending air from the outside of the apparatus to each developing unit 24. The image forming apparatus 100 includes a rear duct 42 for exhausting air from each developing unit 24 to the outside of the apparatus, and a toner filter 43. The image forming apparatus 100 includes a developing duct that forms a space for circulating air for cooling the developing unit 24 along the axial direction of the photosensitive drum 2. Here, a space formed by the bottom surface of the developing unit 24 and the upper surface of the cartridge tray 30 facing the bottom surface configures the developing duct.

In the developing duct formed by the developing unit 24 and the cartridge tray 30, the front side of the apparatus communicates with the front duct 41, and the back side of the apparatus communicates with the rear duct 42, so that one closed space is formed.

The fan 40 is provided on the right side of the front surface of the apparatus main body of the image forming apparatus 100, and sucks air outside the apparatus from an intake port 101a provided on the right side surface side of the image forming apparatus 100 of the front cover 101. The front duct 41 is disposed inside the front cover 101 and extends in the left-right direction, which is the direction in which the developing units 24 are arranged. The front duct 41 has an opening 41a at a position corresponding to each developing unit 24. The openings 41a of the front duct 41 are provided at positions facing openings 102c of each inner door 102 in the axial direction of the photosensitive drum, and communicate with each other by closing the front cover 101. The openings 102c of each inner door 102 are provided at positions corresponding to the opening on the front surface side of the developing duct of each developing unit 24, and communicate with each other by closing the inner door 102.

The rear duct 42 has openings 42a at positions corresponding to each developing unit 24. The openings 42a of the rear duct 42 are provided at positions corresponding to the opening on the rear surface side of the developing duct of each developing unit 24 in the axial direction of the photosensitive drum, and communicate with each other.

As described above, the developing duct, which is a closed space formed between the developing unit 24 and the cartridge tray 30, forms a part of a duct, which is one closed space communicating with the front duct 41 and the rear duct 42. The developing duct formed between the developing unit 24 and the cartridge tray 30 and the front duct 41 and the rear duct 42 communicating with the developing duct form a first cooling duct that is the one closed space serving as a flow path of the developing cooling airflow.

Note that the first cooling duct forms a closed space serving as a flow path of a developing cooling airflow (airflow) for cooling the developing unit 24. That is, the first cooling duct is a developing cooling unit that cools the developing unit that is the developing unit. However, the first cooling duct serving as the developing cooling unit may be partially formed by the duct serving as the closed space formed between the developing unit 24 and the cartridge tray 30, and the other configuration is not limited to the above-described configuration.

Each developing unit 24 is cooled by the developing cooling airflow (solid line illustrated in FIG. 18) flowing through the one closed space described above.

The developing cooling airflow indicated by the solid line in FIG. 18 is first generated by the fan 40 disposed on a front right side of the image forming apparatus and the first cooling duct that is the above-described one closed space.

When the fan 40 rotates, the air outside the apparatus is taken in from the intake port 101a of the front cover 101 provided on the right side surface of the image forming apparatus 100, and is sent to the developing unit 24 to be cooled via the opening 41a of the front duct 41 disposed inside the front cover 101 and the opening 102c of the inner door 102.

The air sent to the developing unit 24 is taken in from the opening on the front side of the developing duct in the front-back direction formed between the developing unit 24 and the cartridge tray 30, sent along the axial direction of the photosensitive drum, and exhausted from the opening on the back side in the front-back direction.

The air exhausted from the back side of the developing duct in the front-back direction formed between the developing unit 24 and the cartridge tray 30 passes through the opening 42a of the rear duct 42, collectively passes through the toner filter 43, and then is exhausted from the back side of the apparatus to the outside of the apparatus.

Here, the toner filter 43 will be described. The toner filter 43 is disposed immediately before an exhaust port on the back side of the apparatus in the rear duct 42. Since the developing cooling airflow is an airflow passing through the periphery of the developing unit 24, it is inevitable that a small amount of toner is taken into the airflow. Therefore, it is desirable to dispose the toner filter 43 immediately before the exhaust port of the developing cooling airflow so as not to exhaust even a small amount of toner to the outside of the apparatus.

In the cooling by the airflow, in general, the airflow is mainly formed using an inexpensive fan, and the same applies to the airflow other than the developing cooling.

(Cooling Configuration of Exposure Head)

Next, a cooling configuration of the exposure head 4 will be described with reference to FIG. 18. In FIG. 18, the flow of air for cooling the exposure head 4 is indicated by a broken line, and the flow of air indicated by the broken line is also referred to as an exposure cooling airflow.

Since the exposure head 4 dissipates heat according to the amount of light emitted from the LED (light emitting element) 51 and is disposed close to the developing unit 24 using toner weak against heat, a cooling unit is required. In particular, in a case where the image forming process is repeated at a high frequency, that is, in a case where the image forming process is used in an apparatus with high productivity, or in a case where an image with high density is continuously output, the light emission time is long, and the light emission amount is also large. Therefore, the amount of heat generated from the LED 51 and the circuit on the substrate 50 on which the LED is mounted also increases.

As a countermeasure against this, for example, the housing 54 of the exposure head 4 is also used as a heat sink, and the exposure head 4 is configured to easily dissipate heat and hardly store heat. However, even in such a case, it is conceivable that the cooling of the exposure head 4 is not in time, heat storage proceeds, and the heat dissipated to the periphery also increases. As a result, the toner in the periphery of the developing sleeve 5 included in the developing unit 24 and a part of the circulating toner inside the developing unit 24 are fused, which may affect a toner coating layer on the surface of the developing sleeve 5, leading to an image defect.

Even in a case where the configuration for cooling the developing unit 24 is provided, it is easily assumed that the heat storage caused by the light emission of the LED 51 is superior in a portion where the exposure head 4 of the developing unit 24 is close. Therefore, it is desirable to provide a cooling configuration (exposure cooling airflow) of the exposure head 4 for cooling the exposure head 4 and discharging heat to the outside of the apparatus separately from the cooling configuration (developing cooling airflow) of the developing unit 24 to suppress the amount of heat dissipated to the periphery of the exposure head 4.

As illustrated in FIG. 8, the developing unit 24 and the developing sleeve 5 of the developing unit 24 are disposed adjacent to the exposure head 4. The surface of the developing sleeve 5 is coated with toner, and due to its structure, the toner adheres to the vicinity of the bearing portions at both ends of the sleeve, and the toner also adheres to the periphery of the developing unit 24. This is because the developing sleeve 5 or the screw 7 is rotated at a high speed, the stirred toner rises up, and the toner is separated from the surface of the developing sleeve 5 or the screw 7. In addition, due to an increase in an internal pressure of the developing unit 24 caused by high-speed rotation of the developing sleeve 5 or the screw 7, toner may be ejected from the gap of the developing unit 24 to the outside.

Therefore, the cooling configuration of the exposure head 4 is desirably a configuration in which the toner in the periphery of the developing unit 24 is not caught and mixed. In other words, in configuring the exposure cooling airflow separately from the developing cooling airflow, it is desirable that the toner in the periphery of the developing unit 24 adjacent to the exposure head 4 is not caught and not mixed.

From the above, it is preferable that the exposure head 4 is cooled in a cooling path different from that of the developing unit 24. In the present embodiment, the configuration is as follows.

The image forming apparatus 100 includes the exposure head 4, the lifting/lowering duct 69, the cartridge tray 30 described above, and the duct unit 60 described later. The exposure head 4 is attached to the lifting/lowering duct 69 disposed in the image forming apparatus 100, and is integrated with the lifting/lowering duct 69. When the exposure head 4 is attached to the lifting/lowering duct 69, the opening 55a of the housing support member 55 of the exposure head 4 communicates with the opening 69a of the lifting/lowering duct 69. The lifting/lowering duct 69 is disposed between the developing support member 301 and the drum support member 302 of the cartridge tray 30, and forms a duct that communicates the exposure head 4 and the duct unit 60 together with the cartridge tray 30. The duct unit 60 is attached immediately below the cartridge tray 30 with respect to the image forming apparatus 100. When the duct unit 60 is attached to the image forming apparatus 100, the opening 61 of the duct unit 60 communicates with the opening 64 of the lifting/lowering duct 69.

In this manner, the housing support member 55, the lifting/lowering duct 69, the cartridge tray 30, and the duct unit 60 of the exposure head 4 form a second cooling duct which is one continuous closed space. Each exposure head 4 is cooled by the exposure cooling airflow (broken line illustrated in FIG. 18) flowing through the one closed space formed by the housing support member 55, the lifting/lowering duct 69, the cartridge tray 30, and the duct unit 60.

The second cooling duct that is one closed space serving as the flow path of the exposure cooling airflow indicated by the broken line in FIG. 18 is configured separately from the first cooling duct that is one closed space serving as the flow path of the developing cooling airflow indicated by the solid line in FIG. 18.

Here, the duct unit 60 constituting a part of the exposure cooling airflow of the present embodiment will be described with reference to FIGS. 18 and 19.

(Duct Unit)

The image forming apparatus 100 includes a duct unit 60 in an attachable/detachable manner. The duct unit 60 will be described with reference to FIGS. 18, 19, 20, and 21. FIG. 18 is a cross-sectional view of the image forming apparatus taken along line A-A in FIG. 2. FIG. 19 is a perspective view of the duct unit as viewed from above. FIG. 20 is a cross-sectional view of the exposure cooling airflow on the intake side, taken along line Y3-Y3 illustrated in FIG. 18. FIG. 21 is a cross-sectional view of the exposure cooling airflow in a direction perpendicular to the optical axis.

The duct unit 60 is an exposure cooling unit that communicates with the exposure head 4 through the lifting/lowering duct 69 and cools the exposure head 4 with an airflow through the lifting/lowering duct 69.

As described above, the lifting/lowering duct 69 is formed in a hollow shape having upper and lower openings (the opening 69a and the opening 64). The lifting/lowering duct 69 forms a duct (exposure duct) in which one opening 69a communicates with the opening 55a of the exposure head 4, and the other opening 64 communicates with the opening 61 of the duct unit 60. The lifting/lowering duct 69 forms an exposure duct that communicates the exposure head 4 and the duct unit 60 to form a space for circulating air for cooling the exposure head 4.

The duct unit 60 is provided on the side opposite to the photosensitive drum 2 with the exposure head 4 interposed therebetween, and is attachably/detachably attached immediately below the cartridge tray 30 with respect to the apparatus main body of the image forming apparatus 100.

The duct unit 60 includes an intake duct 205 as a first duct that communicates with the lifting/lowering duct 69 and forms a space for circulating air introduced into the lifting/lowering duct 69. The intake duct 205 is disposed closer to the back side (deep side, rear surface side) of the image forming apparatus 100 which is one side than the center of the substrate 50 in the longitudinal direction. The intake duct 205 is provided in a longitudinal shape extending in the left-right direction from one side surface (here, a left side surface) of the image forming apparatus in the left-right direction to the exposure head on the other side (right side), and forms a space for circulating an airflow in the left-right direction.

The duct unit 60 has, for each exposure head, an exposure intake port 201 (Y, M, C, K) as a first exposure introduction port that communicates with the lifting/lowering duct 69 and introduces air into the lifting/lowering duct 69. The exposure intake port 201 is provided on an upper surface of the intake duct 205 disposed closer to the back side of the image forming apparatus 100. As illustrated in FIG. 21, the exposure intake port 201 is disposed to face the other surface opposite to the one surface of the substrate 50, and is disposed on the back side (rear surface side) of the image forming apparatus which is one side than the center of the substrate 50 in the longitudinal direction.

The duct unit 60 has the intake port 203 for taking in air from the outside of the image forming apparatus in the intake duct 205. The intake port 203 is provided in the intake duct 205 to face an exterior cover forming an outer surface (here, a left side surface) of the image forming apparatus. The intake port 203 is disposed on the back side (rear surface side) of the image forming apparatus which is one side than the center of the substrate 50 in the longitudinal direction. The intake port 203 is disposed adjacent to one side surface (here, a left side surface) of the image forming apparatus in the left-right direction orthogonal to the longitudinal direction.

The duct unit 60 includes an intake fan 62 that generates an airflow for discharging the air outside the image forming apparatus introduced from the intake port 203 from the exposure intake port 201 through the intake duct 205. The intake fan 62 is disposed in the intake port 203 of the intake duct 205.

The intake port 203 and the exposure intake port 201 (Y, M, C, K) of each exposure head are coupled by the intake duct 205. The duct unit 60 is configured to take in air (fresh air) outside the image forming apparatus introduced from the intake port 203 by the intake fan 62 from each exposure intake port 201 through the intake duct 205.

The duct unit 60 includes an exhaust duct 206 as a second duct that communicates with the lifting/lowering duct 69 and forms a space for circulating the air introduced from the lifting/lowering duct 69. The exhaust duct 206 is disposed closer to the front side (front side, front surface side) of the image forming apparatus 100 which is the other side than the center of the substrate 50 in the longitudinal direction. The exhaust duct 206 is provided in a longitudinal shape extending in the left-right direction from one side surface (here, a left side surface) of the image forming apparatus in the left-right direction to the exposure head on the other side (right side), and forms a space for circulating an airflow in the left-right direction.

The duct unit 60 has, for each exposure head, an exposure exhaust port 202 (Y, M, C, K) as a second exposure introduction port that communicates with the lifting/lowering duct 69 and introduces air from the lifting/lowering duct 69. The exposure exhaust port 202 is provided on the upper surface of the exhaust duct 206 disposed closer to the front side of the image forming apparatus 100. As illustrated in FIG. 21, the exposure exhaust port 202 is disposed to face the other surface of the substrate 50, and is disposed on the front side (front surface side) of the image forming apparatus which is the other side than the center of the substrate 50 in the longitudinal direction.

The duct unit 60 has an exhaust port 204 that exhausts air from the exhaust duct 206 to the outside of the image forming apparatus. The exhaust port 204 is provided in the exhaust duct 206 to face an exterior cover forming an outer surface (here, a left side surface) of the image forming apparatus. The exhaust port 204 is disposed on the front side (front surface side) of the image forming apparatus which is the other side than the center of the substrate 50 in the longitudinal direction. Similarly to the intake port 203, the exhaust port 204 is disposed adjacent to one side surface (here, a left side surface) of the image forming apparatus in the left-right direction orthogonal to the longitudinal direction.

The duct unit 60 includes an exhaust fan 63 that generates an airflow for exhausting the air introduced from the exposure exhaust port 202 from the exhaust port 204 through the exhaust duct 206. The exhaust fan 63 is disposed in the exhaust port 204 of the exhaust duct 206.

The exhaust port 204 and the exposure exhaust port 202 (Y, M, C, K) for each exposure head are coupled by the exhaust duct 206. The duct unit 60 is configured to exhaust air introduced from each exposure exhaust port 202 by the exhaust fan 63 to the outside of the image forming apparatus from the exhaust port 204 through the exhaust duct 206.

The duct unit 60 is integrally provided with the intake fan 62, the exhaust fan 63, the intake duct 205, and the exhaust duct 206, and is attachably/detachably attached to the apparatus main body of the image forming apparatus 100 immediately below the cartridge tray 30.

In addition, the duct unit 60 includes the intake port 203 and the exhaust port 204 on the same surface side (left side surface side) of the image forming apparatus 100 in the left-right direction, and the intake fan 62 is disposed in the intake port 203 and the exhaust fan 63 is disposed in the exhaust port 204 respectively. In the present embodiment, as illustrated in FIG. 18, the intake fan 62 disposed closer to the back side of the image forming apparatus 100 functions as an intake fan that takes in air outside the apparatus, and the exhaust fan 63 disposed closer to the front side functions as an exhaust fan that exhausts air to the outside of the apparatus.

A louver (not illustrated) as an opening is formed at a position facing each of the fans 62 and 63 in the exterior cover forming the exterior of the outer surface (here, a left side surface) of the image forming apparatus. The louver formed in the exterior cover communicates with the intake port 203 and the exhaust port 204 in which the fans 62 and 63 are disposed respectively. Intake from the intake port 203 by the intake fan 62 and exhaust from the exhaust port 204 by the exhaust fan 63 are directly performed with respect to the outside of the apparatus through the louver formed in the exterior cover forming the exterior of the left side surface of the image forming apparatus.

As described above, in the duct unit 60, the intake fan 62 disposed closer to the back side of the image forming apparatus 100 functions as an intake fan that takes in air from the outside of the apparatus. Therefore, when the intake fan 62 rotates, air is taken into the intake duct 205 from the outside of the apparatus through the intake port 203. The air taken in from the outside of the apparatus flows from the left side to the right side of the image forming apparatus 100 along the intake duct 205 as indicated by a dotted line (intra-duct airflow 310) in FIG. 20. As illustrated in FIG. 20, the air flowing from the left side to the right side of the apparatus in the intake duct 205 flows through the exposure intake port 201 for each color provided on the upper surface of the intake duct 205 while branching from the left side of the apparatus to exposure intake ports 201Y, 201M, 201C, and 201K in this order.

The air sent from the exposure intake port 201 of the duct unit 60 is sent upward from a first opening 73 communicating with the exposure intake port 201 through a space between the cartridge tray 30 and the lifting/lowering duct 69. The air sent upward through a space between the cartridge tray 30 and the lifting/lowering duct 69 is blown onto the rear surface of the substrate 50 of the exposure head 4 through the opening 69a of the lifting/lowering duct 69 and the opening 55a of the exposure head 4 communicating vertically.

Here, the first opening 73 is an opening which communicates with the exposure intake port 201 of the duct unit 60, on a side closer to the back side of the apparatus in the opening 64 formed by the cartridge tray 30 and the lifting/lowering duct 69.

That is, the first opening 73 is disposed on the back side of the image forming apparatus which is one side than the center of the substrate 50 in the longitudinal direction, and faces the exposure intake port 201 when the duct unit 60 is attached.

The exposure head 4 and the duct unit 60 communicate with each other by a duct (cooling duct 75) formed by the cartridge tray 30 and the lifting/lowering duct 69. Therefore, the airflow blown onto the rear surface of the substrate 50 is guided in the duct (for example, from the back side to the front side of the substrate in the longitudinal direction), and the substrate 50 is cooled in the process.

At the same time as the intake described above, in the duct unit 60, the exhaust fan 63 disposed closer to the front side of the image forming apparatus 100 functions as an exhaust fan that exhausts air from the inside of the duct unit 60 to the outside of the apparatus. Therefore, when the exhaust fan 63 rotates, air is taken in from the exposure exhaust port 202 (Y, M, C, K) for each color provided on the upper surface of the exhaust duct 206. The exposure exhaust port 202 communicates with a second opening 74. Therefore, air in the duct (cooling duct 75) formed by the cartridge tray 30 and the lifting/lowering duct 69 is taken in from the exposure exhaust port 202 for each color provided on the upper surface of the exhaust duct 206 through the second opening 74 communicating vertically.

Here, the second opening 74 is an opening which communicates with the exposure exhaust port 202 of the duct unit 60, on a side closer to the front side of the apparatus in the opening 64 formed by the cartridge tray 30 and the lifting/lowering duct 69.

That is, the second opening 74 is disposed on the other end side than the center of the substrate 50 in the longitudinal direction, and faces the exposure exhaust port 202 when the duct unit 60 is attached.

Air is taken in from the exposure exhaust port 202 of the duct unit 60 through the second opening 74. As a result, in the duct formed by the cartridge tray 30 and the lifting/lowering duct 69 and the exposure head 4 integrally supported by the lifting/lowering duct 69, an exposure cooling airflow which is a flow of air indicated by a dotted line (intra-duct airflow 311) in FIG. 18 is generated, and the substrate 50 on which the LED 51 is mounted is cooled.

In the duct unit 60, the air taken in from the exposure exhaust port 202 of the exhaust duct 206 sequentially merges in the order of exposure exhaust ports 202K, 202C, 202M, and 202Y from the right side of the apparatus inside the exhaust duct 206 and flows from the right side to the left side of the apparatus as indicated by an intra-duct airflow 312 in FIG. 21. The air inside the apparatus finally taken into the exhaust duct 206 is exhausted to the outside of the apparatus through the exhaust port 204.

Figure 19:
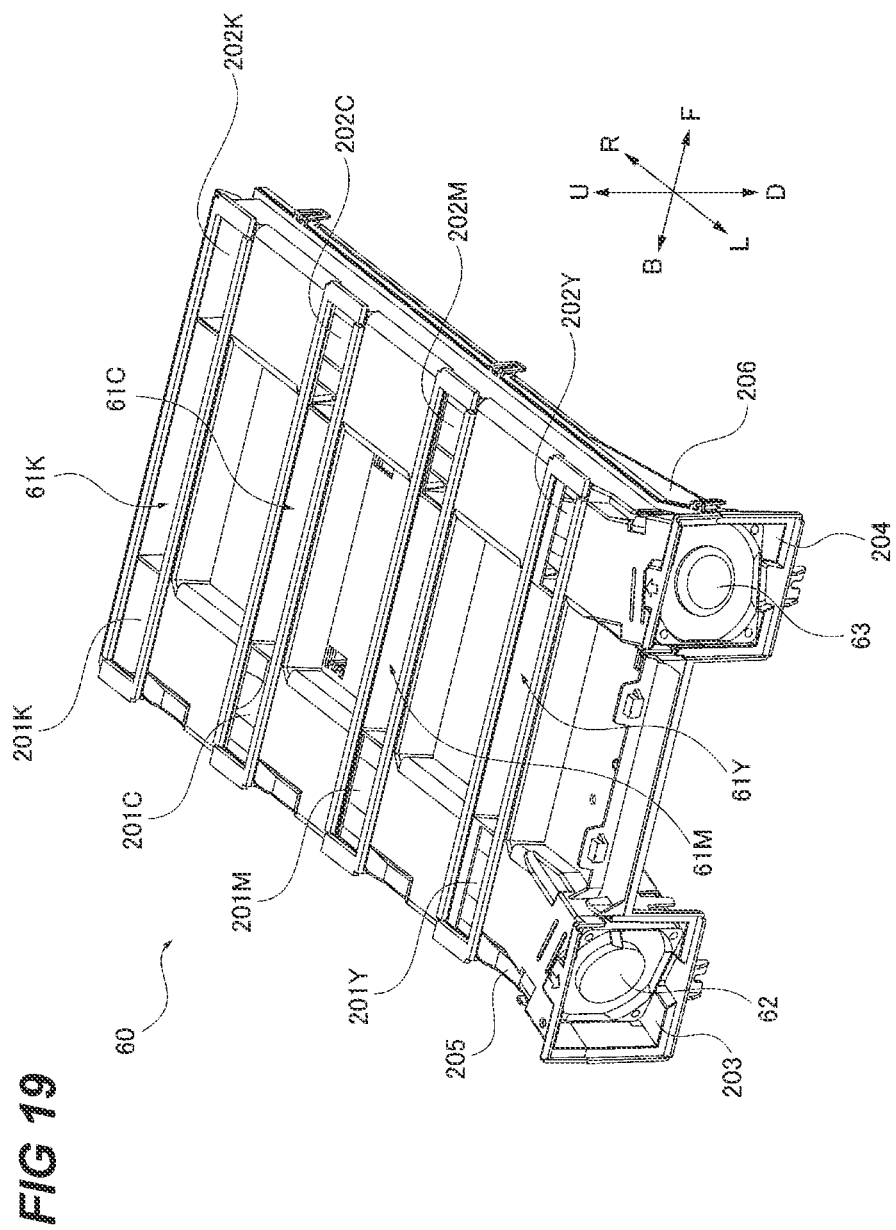
FIG. 19 is a perspective view of a duct unit.

As illustrated in FIG. 19, the duct unit 60 has the opening 61 (Y, M, C, K) in its upper surface for each exposure head. The opening 61 of the duct unit 60 includes the exposure intake port 201 provided closer to the back side of the apparatus and exposure exhaust port 202 provided closer to the front side of the apparatus. The opening 61 (Y, M, C, K) of the duct unit 60 is provided so as to correspond to each of the exposure heads 4 of the respective colors.

That is, an opening 61Y of the duct unit 60 includes an exposure intake port 201Y provided closer to the back side of the apparatus and the exposure exhaust port 202Y provided closer to the front side of the apparatus. An opening 61M of the duct unit 60 includes the exposure intake port 201M provided closer to the back side of the apparatus and the exposure exhaust port 202M provided closer to the front side of the apparatus. An opening 61C of the duct unit 60 includes the exposure intake port 201C provided closer to the back side of the apparatus and the exposure exhaust port 202C provided closer to the front side of the apparatus. An opening 61K of the duct unit 60 includes the exposure intake port 201K provided closer to the back side of the apparatus and the exposure exhaust port 202K provided closer to the front side of the apparatus.

The opening 61 of the duct unit 60 is provided at a position facing the opening 64 of the lifting/lowering duct 69 for each exposure head, and is connected to the opening 64 to communicate with the exposure head 4 to form a closed space.

Figure 22:
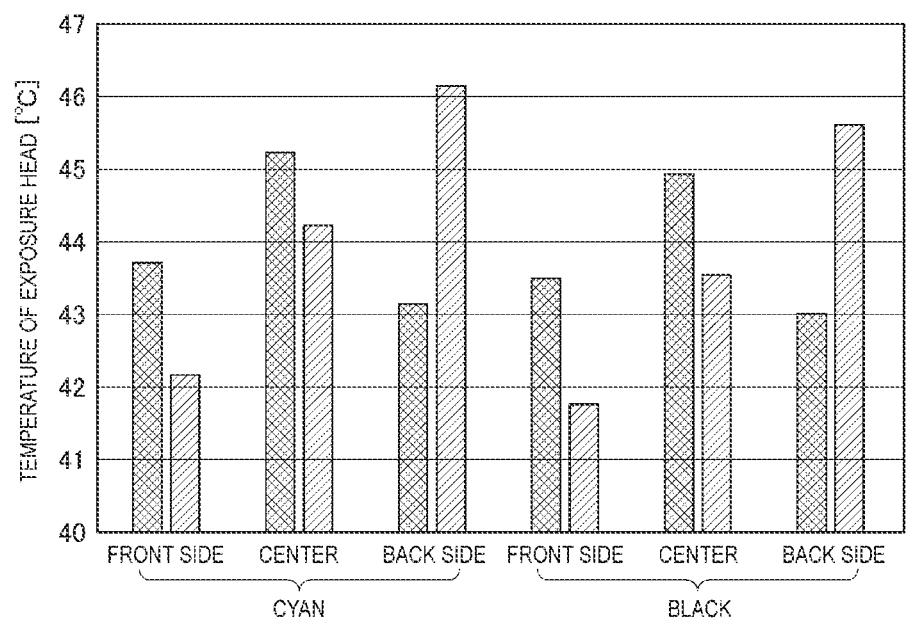
FIG. 22 is a view illustrating a temperature of the exposure head in a longitudinal direction.

Here, saturation temperatures at the front, center, and back of the housing 54 of the exposure head 4 in the longitudinal direction will be described. FIG. 22 is a view illustrating an example of saturation temperatures at the front, center, and back of the housing 54 of the exposure head 4. The temperatures of the exposure head 4 illustrated in FIG. 22 are examples of a result of cooling the exposure head 4 by using the duct unit 60 of the present embodiment and a duct unit of a comparative example in the image forming apparatus illustrated in FIG. 2. As described above, in the duct unit 60 according to the present embodiment, the fan 62 closer to the back side of the apparatus functions as an intake fan, and the fan 63 closer to the front side functions as an exhaust fan. On the other hand, in the duct unit of the comparative example, a fan closer to the front side of the apparatus functions as an intake fan, and a fan closer to the back side functions as an exhaust fan. By using each duct unit in the image forming apparatus illustrated in FIG. 2, image formation was continuously performed in a pattern in which the exposure heads 4 of two colors of black and cyan emit light in an environment of 35° C. FIG. 22 illustrates an example of the result.

Figure 20:
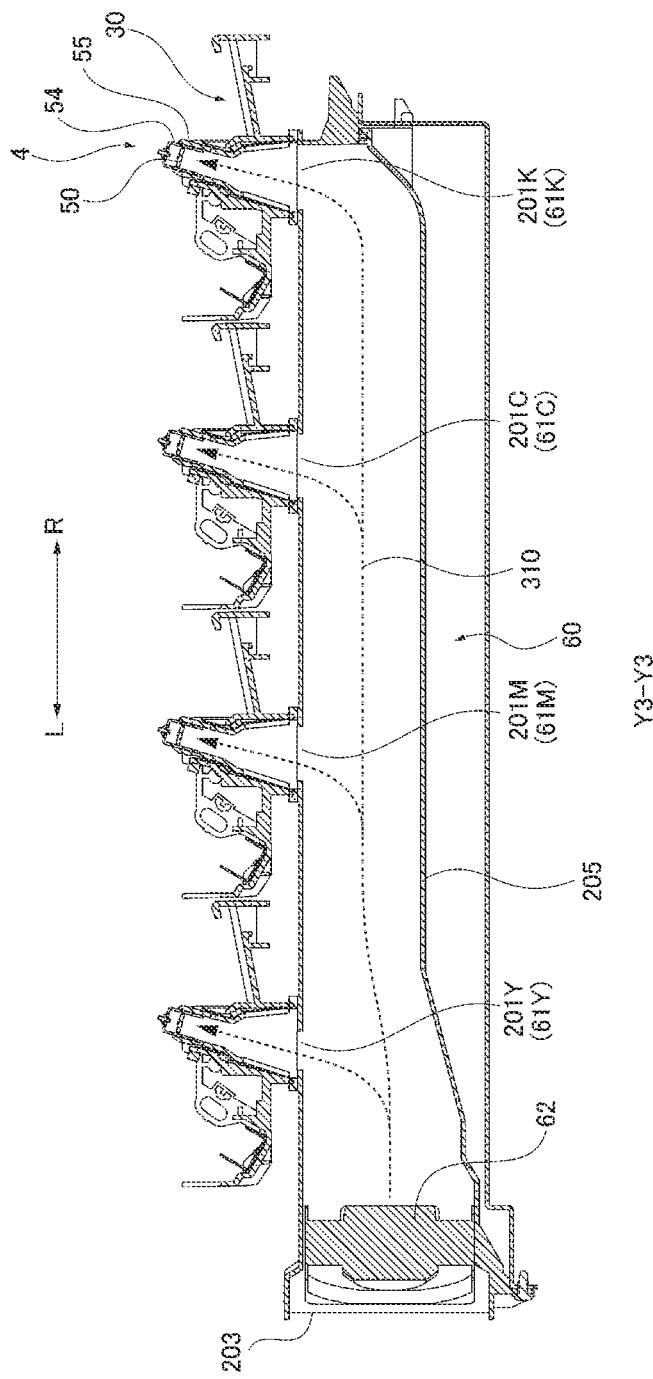
FIG. 20 is a cross-sectional view of an exposure cooling airflow on an intake side.
Figure 21:
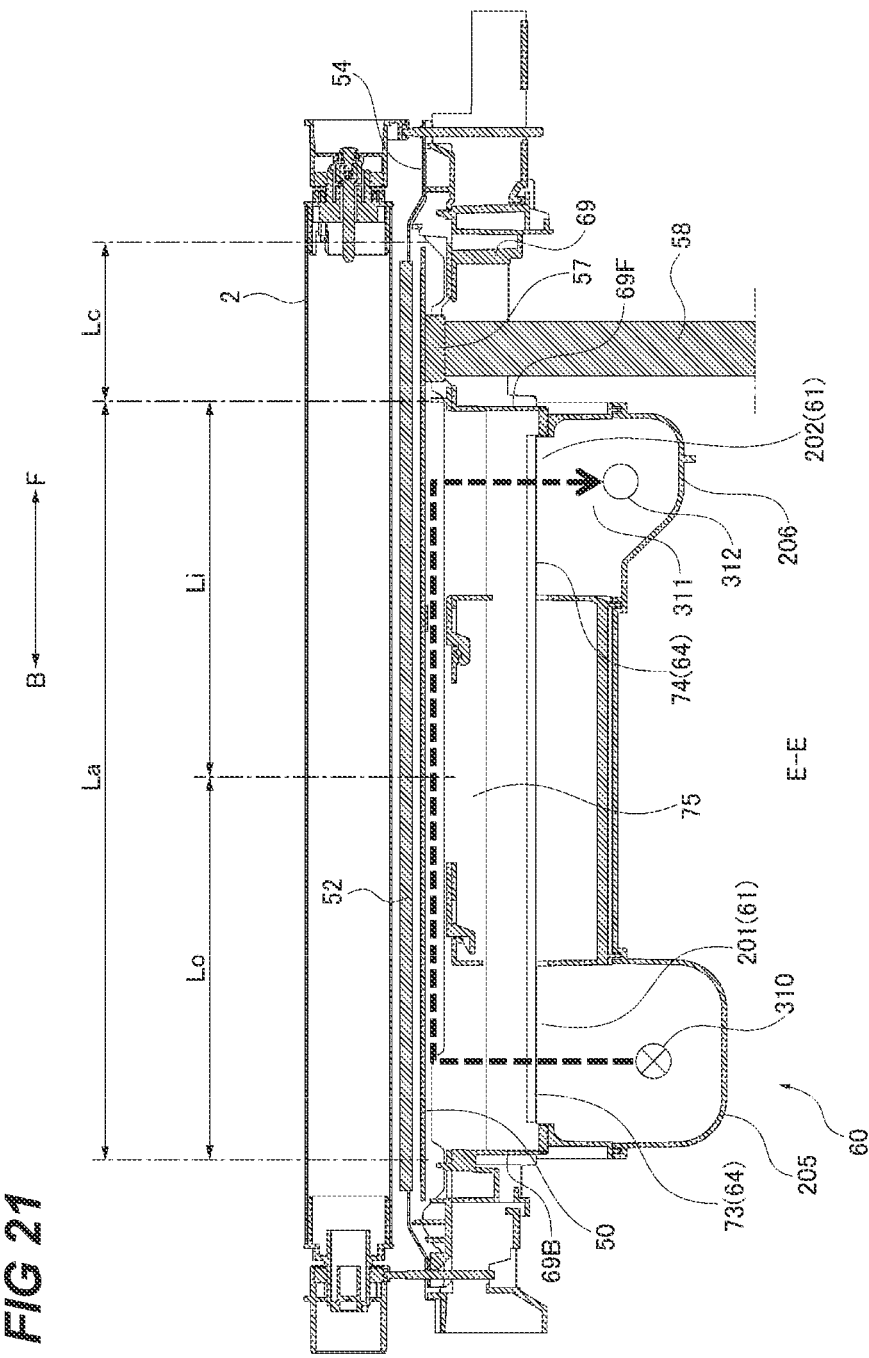
FIG. 21 is a cross-sectional view of the exposure cooling airflow in a direction perpendicular to an optical axis.

Referring to the result illustrated in FIG. 20, in the configuration of the comparative example in which the intake and exhaust are reversed, a temperature gradient of about 4° C. occurs from the front side to the back side of the apparatus in the longitudinal direction of the exposure head. On the other hand, in the configuration of the present embodiment in which the intake fan is provided on the back side of the apparatus, the temperature at the center tends to be the highest in the longitudinal direction of the exposure head, and it can be seen that a temperature difference between both sides (front side, back side) with respect to the center is about 2° C., which is half of that of the comparative example.

As described above, according to the present embodiment, the intake port 203 of the duct unit 60 is disposed on one side surface of the image forming apparatus in the left-right direction orthogonal to the longitudinal direction, on the back side of the image forming apparatus which is one side than the center of the substrate 50 in the longitudinal direction. As a result, air is taken in from the outside of the apparatus through the intake port 203 disposed closer to the back side of the image forming apparatus 100. The exposure intake port 201 of the duct unit 60 is disposed on the back side of the image forming apparatus which is one side than the center of the substrate 50 in the longitudinal direction. As a result, the air taken in from the outside of the apparatus through the intake port 203 is blown to the exposure head 4 from each exposure intake ports 201Y, 201M, 201C, and 201K disposed closer to the back side of the image forming apparatus. As a result, the temperature rise on the apparatus rear surface side of the exposure head 4 can be suppressed, and the temperature gradient of the substrate 50 in the longitudinal direction can be suppressed.

Further, as described above, the duct unit 60, the cartridge tray 30, the lifting/lowering duct 69, and the housing support member 55 form a continuous closed space to configure the exposure cooling airflow. As illustrated in FIG. 18, the intake fan 62 and the exhaust fan 63 of the duct unit 60 face the outside of the apparatus only through the exterior cover of the apparatus. The flow path of the exposure cooling airflow is completed by a minimum path formed by directly taking in air from the louver of the exterior cover into the duct unit 60 and directly exhausting air from the duct unit 60. Therefore, the intake and exhaust flow hardly affects atmosphere air inside the apparatus.

Note that there is a finisher as an option on the sheet ejection side of the image forming apparatus 100, and at the time of attaching the finisher, substantially the entire area of the left side surface of the image forming apparatus 100 facing the intake fan 62 and the exhaust fan 63 is closed by the finisher. In this case, intake and exhaust by the intake fan 62 and the exhaust fan 63 are performed to the inside of the finisher, but the inside of the finisher has many cavities. Therefore, the louver (not illustrated) of the exterior cover is disposed so as to avoid the front surface of the main structure inside the finisher. As a result, it is possible to suppress a decrease in performance of the exposure cooling airflow to an extent that there is no issue in practical use.

In the embodiment described above, a four-color full-color printer of a tandem system-intermediate transfer system has been described as an example, but for example, a direct transfer system in which a toner image is transferred from the photosensitive drum 2 to the recording sheet P without using the intermediate transfer belt 9 may be used. Furthermore, a full color printer of five or more colors using single color mono-color toner or special color toner may be used. In that case, a configuration including the respective exposure heads 4 corresponding to the number of colors may be used.

In addition, the vertical direction of the unit and the component has been described according to the arrangement of each unit in the cross-sectional view of the image forming apparatus 100 illustrated in FIG. 2. However, a unit arrangement in which the photosensitive drum 2 is disposed above the intermediate transfer belt 9 and the exposure head 4 is further disposed above the photosensitive drum 2 as in the upper surface exposure system in which the photosensitive drum 2 is exposed from substantially above may be adopted. In this case, the up and down directions in the description of the embodiment are all reversed, and the duct unit 60 is configured to descend immediately before the assembling position.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-167078, filed Oct. 18, 2022, which is hereby incorporated by reference herein in its entirety.

What is claimed is:

1. An image forming apparatus comprising:
a photoreceptor having a rotation axis extending in a first direction connecting a front surface and a rear surface of the image forming apparatus;
an exposure unit configured to expose the photoreceptor to form a latent image on the photoreceptor; and
a cooling unit configured to cool the exposure unit,
wherein the exposure unit includes a substrate that has a longitudinal axis extending in the first direction, has a first surface on which a plurality of light emitting elements configured to emit light toward the photoreceptor are mounted, and has a second surface opposite to the first surface,
wherein the cooling unit includes an intake port that is configured to suck air from outside of the image forming apparatus and that is disposed at an intake port distance in the first direction to the rear surface, the intake port distance being shorter than a first distance in the first direction from a center of the substrate to the rear surface,
wherein the cooling unit is configured to cool the substrate by blowing air sucked by the intake port onto the second surface of the substrate,
wherein the cooling unit further includes an exhaust port configured to exhaust air to the outside of the image forming apparatus, and
wherein the exhaust port is disposed at an exhaust port distance in the first direction to the front surface, the exhaust port distance being shorter than a second distance in the first direction of the center of the substrate to the front surface.

2. The image forming apparatus according to claim 1,
wherein the exposure unit further includes a housing that defines a housing space where the second surface of the substrate is exposed,
wherein the cooling unit further includes a first duct coupled to the intake port,
wherein the first duct is provided with a first opening configured to introduce air into the housing space of the exposure unit, and
wherein the first opening faces the second surface of the substrate and is disposed at a first opening distance in the first direction to the rear surface, the first opening distance being shorter than the first distance in the first direction of the center of the substrate to the rear surface.

3. The image forming apparatus according to claim 2, wherein the first duct has a longitudinal shape extending in a second direction intersecting the first direction, and the first duct is disposed at a first duct distance in the first direction to the rear surface, the first duct distance being shorter than the first distance in the first direction of the center of the substrate to the rear surface.

4. The image forming apparatus according to claim 2,
wherein the cooling unit further includes an intake fan disposed at the intake port, and
wherein the intake fan is configured to generate an airflow that sucks air from the outside of the image forming apparatus through the intake port into the first duct and that carries the air in the first duct to the first opening.

5. The image forming apparatus according to claim 1, wherein the intake port is disposed on one side surface of the image forming apparatus in a second direction intersecting the first direction.

6. The image forming apparatus according to claim 1,
wherein the exposure unit further includes a housing that defines a housing space where the second surface of the substrate is exposed,
wherein the cooling unit further includes a second duct coupled to the exhaust port,
wherein the second duct is provided with a second opening configured to suck air from the housing space of the exposure unit, and
wherein the second opening faces the second surface of the substrate and is disposed at a second opening distance in the first direction to the front surface, the second opening distance being shorter than the second distance in the first direction of the center of the substrate to the front surface.

7. The image forming apparatus according to claim 6, wherein the second duct has a longitudinal shape extending in a second direction intersecting the first direction, and the second duct is disposed at a second duct distance in the first direction to the front surface, the second duct distance being shorter than the second distance in the first direction of the center of the substrate to the front surface.

8. The image forming apparatus according to claim 6,
wherein the cooling unit further includes an exhaust fan disposed at the exhaust port, and
wherein the exhaust fan is configured to generate an airflow that sucks air in the housing space of the exposure unit through the second opening into the second duct and that exhausts the air in the second duct through the exhaust port.

9. The image forming apparatus according to claim 1,
wherein the intake port and the exhaust port are disposed on one side surface of the image forming apparatus in a second direction intersecting the first direction.

10. The image forming apparatus according to claim 1, further comprising:
a support member configured to support the exposure unit so as to be lifted and lowered,
wherein the exposure unit further includes a housing that defines a housing space where the second surface of the substrate is exposed,
wherein the cooling unit further includes an exhaust port configured to exhaust air to the outside of the image forming apparatus,
wherein the exhaust port is disposed at an exhaust port distance in the first direction to the front surface, the exhaust port distance being shorter than a second distance in the first direction of the center of the substrate to the front surface,
wherein the cooling unit further includes a first duct coupled to the intake port,
wherein the first duct is provided with a first opening configured to introduce air into the housing space of the exposure unit, and
wherein the first opening faces the second surface of the substrate and is disposed at a first opening distance in the first direction to the rear surface, the first opening distance being shorter than the first distance in the first direction of the center of the substrate to the rear surface,
wherein the cooling unit further includes a second duct coupled to the exhaust port,
wherein the second duct is provided with a second opening configured to suck air from the housing space of the exposure unit, and
wherein the second opening faces the second surface of the substrate and is disposed at a second opening distance in the first direction to the front surface, the second opening distance being shorter than the second distance in the first direction of the center of the substrate to the front surface, and
wherein the support member has a longitudinal shape extending in an axial direction of the rotation axis of the photoreceptor and including the first opening to the second opening of the cooling unit, and forms a third duct that communicates the exposure unit and the cooling unit to form a flow path of an airflow.

11. An image forming apparatus comprising:
a photoreceptor having a rotation axis extending in a first direction connecting a front surface and a rear surface of the image forming apparatus;
an exposure unit configured to expose the photoreceptor to form a latent image on the photoreceptor; and
a cooling unit configured to cool the exposure unit,
wherein the exposure unit includes:
a substrate that has a longitudinal axis extending in the first direction, has a first surface on which a plurality of light emitting elements configured to emit light toward the photoreceptor are mounted, and has a second surface opposite to the first surface, and
a housing that defines a housing space where the second surface of the substrate is exposed,
wherein the cooling unit includes:
an intake port that is disposed at an intake port distance in the first direction to the rear surface, the intake port distance being shorter than a first distance in the first direction of a center of the substrate to the rear surface, and
a first duct that is coupled to the intake port and is provided with a first opening configured to introduce air into the housing space of the exposure unit where the first opening faces the second surface of the substrate and is disposed at a first opening distance in the first direction to the rear surface, the first opening distance being shorter than the first distance in the first direction from the center of the substrate to the rear surface,
wherein the cooling unit further includes an exhaust port configured to exhaust air to the outside of the image forming apparatus, and
wherein the exhaust port is disposed at an exhaust port distance in the first direction to the front surface, the exhaust port distance being shorter than a second distance in the first direction of the center of the substrate to the front surface.

12. The image forming apparatus according to claim 11,
wherein the cooling unit further includes a second duct coupled to the exhaust port,
wherein the second duct is provided with a second opening configured to suck air from the housing space of the exposure unit, and
wherein the second opening faces the second surface of the substrate and is disposed at a second opening distance in the first direction to the front surface, the second opening distance beings shorter than the second distance in the first direction of the center of the substrate to the front surface.

13. The image forming apparatus according to claim 12,
- wherein the cooling unit further includes an intake fan disposed at the intake port and an exhaust fan disposed the exhaust port,
- wherein the intake fan is configured to generate an airflow that sucks air from the outside of the image forming apparatus through the intake port into the first duct and that carries the air in the first duct to the first opening, and
- wherein the exhaust fan is configured to generate an airflow that sucks air in the housing space of the exposure unit through the second opening into the second duct and that exhausts the air in the second duct through the exhaust port.

\* \* \* \* \*